United States Patent
Zhang et al.

(10) Patent No.: US 11,592,113 B2
(45) Date of Patent: Feb. 28, 2023

(54) VASOCONSTRICTION-LIKE PINCH VALVE FOR LOCALIZED FLOW CONTROL

(71) Applicant: The Board of Trustees of the University of Illinois, Urbana, IL (US)

(72) Inventors: Yang Zhang, Champaign, IL (US); Long Zhou, Urbana, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 450 days.

(21) Appl. No.: 16/807,490

(22) Filed: Mar. 3, 2020

(65) Prior Publication Data
US 2020/0281716 A1    Sep. 10, 2020

Related U.S. Application Data

(60) Provisional application No. 62/813,721, filed on Mar. 4, 2019.

(51) Int. Cl.
*F16K 7/04* (2006.01)
*F16K 31/08* (2006.01)

(52) U.S. Cl.
CPC ............ *F16K 7/045* (2013.01); *F16K 31/082* (2013.01); *F16K 31/084* (2013.01); *F16K 7/04* (2013.01)

(58) Field of Classification Search
CPC ............ F16K 7/04; F16K 7/045; F16K 31/08; F16K 31/082

(Continued)

(56) References Cited

U.S. PATENT DOCUMENTS 2,128,585 A  *  8/1938  Hannay .................. B60B 39/04
                                                      291/44
4,524,802 A  *  6/1985  Lawrence ............. F16K 11/027
                                                     137/636

(Continued)

FOREIGN PATENT DOCUMENTS

CA          2056033 C      11/1994
CN        106763991 A       5/2017

OTHER PUBLICATIONS

P. Maeder-York et al., "Biologically Inspired Soft Robot for Thumb Rehabilitation," Harvard Engineering, accessed Nov. 4, 2018, 2 pages.

(Continued)

*Primary Examiner* — Umashankar Venkatesan
(74) *Attorney, Agent, or Firm* — Crowell & Moring LLP

(57) ABSTRACT

The present disclosure describes one or more embodiments of a device for localized flow control. The device includes a plunger configured to slide along a longitudinal axis; a gate connecting to a proximal end of the plunger and configured to slide with the plunger; a spacer disposed along the longitudinal axis and on a same side with the gate relative to the plunger; a soft tube disposed in a gap between the spacer and a proximal end of the gate; and a plunger controller configured to slide the plunger between a closed position and an open position. In response to the plunger at the open position, the device is at an open state configured to allow a flow in the soft tube, and in response to the plunger at the closed position, the device is at a closed state configured to cut off the flow in the soft tube.

19 Claims, 22 Drawing Sheets
(17 of 22 Drawing Sheet(s) Filed in Color)

(58) Field of Classification Search
USPC .............................................................. 251/7
See application file for complete search history.

(56) References Cited

U.S. PATENT DOCUMENTS

| | | | |
|---|---|---|---|
| 5,188,334 A | | 2/1993 | Yoshii et al. |
| 5,697,285 A | | 12/1997 | Nappi et al. |
| 5,810,324 A | * | 9/1998 | Eriksson ............... A61M 16/20 251/129.09 |
| 6,386,505 B2 | * | 5/2002 | Schob ................... F16K 31/082 251/7 |
| 6,814,337 B2 | * | 11/2004 | Schmaltz .............. A61F 5/4405 251/294 |
| 10,576,201 B2 | * | 3/2020 | Payne ..................... F16K 7/045 |
| 2020/0282361 A1 | * | 9/2020 | Gebauer .................... F16K 7/06 |

OTHER PUBLICATIONS

P. Polygerinos et al., "Towards a soft pneumatic glove for hand rehabilitation," in: Intell. Robot. Syst. (IROS), 2013 IEEE/RSJ Int. Conf., Nov. 3-7, 2013, 6 pages.

S.C. Obiajulu et al., "Soft Pneumatic Artificial Muscles With Low Threshold Pressures for a Cardiac Compression Device." Aug. 4-7, 2013, Portland, OR, 8 pages.

A.D. Marchese et al., "A Recipe for Soft Fluidic Elastomer Robots," Soft Robotics, doi:10.1089/soro.2014.0022, 19 pages.

A. Nemiroski et al., "Arthrobots," Soft Robot. 4 (2017) soro.2016. 0043. doi:10.1089/soro.2016.0043, 20 pages.

H. Jiang et al., "Design and simulation analysis of a soft manipulator based on honeycomb pneumatic networks," 2016 IEEE Int. Conf. Robot. Biomimetics, ROBIO, Conference Paper 2016, 8 pages.

R.K. Katzschmann et al., "Autonomous Object Manipulation Using a Soft Planar Grasping Manipulator," Soft Robotics, vol. 2, No. 4, 2015, 10 pages.

A.D. Marchese et al., "Whole arm planning for a soft and highly compliant 2D robotic manipulator," in: IEEE Int. Conf. Intell. Robot. Syst., IEEE, 2014, 8 pages.

A.D. Marchese et al., "Autonomous Soft Robotic Fish Capable of Escape Maneuvers Using Fluidic Elastomer Actuators," Soft Robotics, vol. 1, No. 1, 2014; 13 pages.

M.T. Tolley et al., "A Resilient, Untethered Soft Robot," Soft Robotics, Jan. 2014, 31 pages.

M.A. Robertson, J. Paik, "New soft robots really suck: vacuum powered systems empower diverse capabilities," https://infoscience. epfl.ch/record/230432/files/Accepted Author's Version.pdf accessed Oct. 23, 2017, 27 pages.

A. Zatopa et al., "Fully Soft 3D-Printed Electroactive Fluidic Valve for Soft Hydraulic Robots," Soft Robotics, vol. 5, No. 3, 2018, 15 pages.

Stokes, A. et al, "A Hybrid Combining Hard and Soft Robots," Soft Robotics, Jan. 2013, 5 pages.

"Soft Robotic Grippers for Biological Sampling on Deep Reefs," https://doi.org/10.1089/soro.2015.0019, vol. 3, No. 1, 2016, 11 pages.

Inventors' Publications & Disclosures—Inventor's Presentation at APS March meeting. Mar. 5, 2018, 11 pages.

* cited by examiner

400a

400b

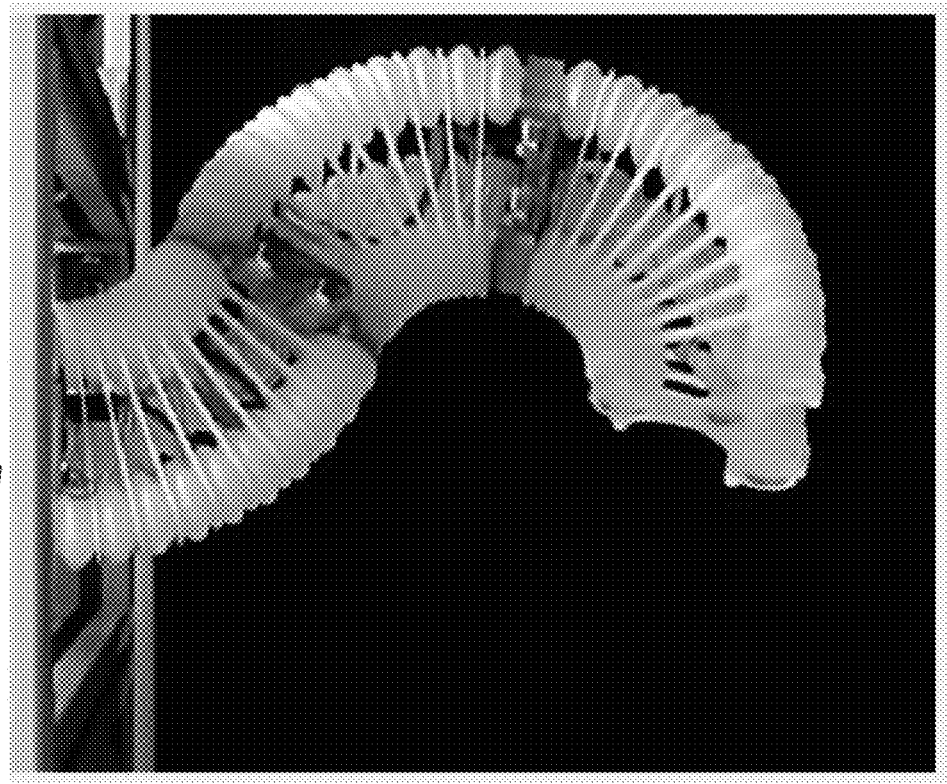
922
FIG. 9B
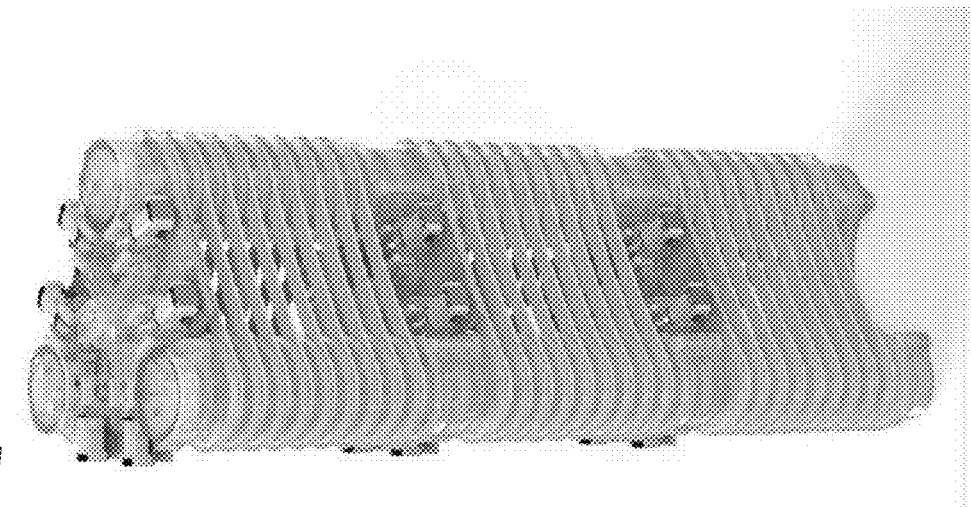
920

US 11,592,113 B2

VASOCONSTRICTION-LIKE PINCH VALVE FOR LOCALIZED FLOW CONTROL

RELATED APPLICATION

This application claims priority to Provisional Application No. 62/813,721, filed on Mar. 4, 2019, which is incorporated by reference in its entirety.

FIELD OF THE TECHNOLOGY

The present disclosure relates to a flow valve, and is particularly directed to a valve for opening and/or cutting off a flow in a tube.

BACKGROUND

Development of robots partially or completely made of soft materials enables their wide applications, partially due to their intrinsic safety to human and the environment. Soft robots may use some types of actuators. In soft robots including fluid-driven actuators, controlling the pressure in each actuator is the basic approach to control the fluid-powered soft robots. A few problems and/or issues are associated with different types of fluid-driven actuators. One of the problems and/or issues is that a soft robot may include multiple tubes connecting multiple valves behind the scene, making the robot look like a marionette. The multiple tubes may become a problem when more actuators are added to a robot, which may limit the scalability of the robotic system. Most valves for high-pressure applications may have heavy metal frame, too heavy and/or too big for the robots to carry. These problems and/or issues with these types of fluid-driven actuators may impose more challenges for the development of soft robots.

The present disclosure describes various embodiments of vasoconstriction-like pinch valves for localized flow control, which addresses at least some of the problems/issues discussed above.

BRIEF SUMMARY

Embodiments of the present disclosure include methods, devices, and computer readable medium for a vasoconstriction-like pinch valve for localized flow control.

The present disclosure is directed to a device for localized flow control. The device includes a plunger configured to slide along a longitudinal axis, the plunger comprising a proximal end and a distal end along the longitudinal axis; a gate connecting to the proximal end of the plunger and configured to slide with the plunger along the longitudinal axis; a spacer disposed along the longitudinal axis and on a same side with the gate relative to the plunger; a soft tube disposed in a gap between the spacer and a proximal end of the gate; and a plunger controller enclosing the distal end of the plunger and configured to slide the plunger between a closed position and an open position along the longitudinal axis. In response to the plunger at the open position, the device is at an open state and the gap has a first width configured to allow a flow in the soft tube, and in response to the plunger at the closed position, the device is at a closed state and the gap has a second width configured to cut off the flow in the soft tube.

The present disclosure also describes a method for localized flow control with a valve. The method includes sending, by a circuitry electrically connecting with a valve, an electric current to the valve to switch the valve. The valve includes a plunger configured to slide along a longitudinal axis, the plunger comprising a proximal end and a distal end along the longitudinal axis, a gate connecting to the proximal end of the plunger and configured to slide with the plunger along the longitudinal axis, a spacer disposed along the longitudinal axis and on a same side with the gate relative to the plunger, a soft tube disposed in a gap between the spacer and a proximal end of the gate, and a plunger controller enclosing the distal end of the plunger and configured to slide the plunger between a closed position and an open position along the longitudinal axis. The plunger controller comprises a solenoid configured to receive the electric current from the circuitry. In response to the electric current from the circuitry being an opening current, the plunger controller is configured to switch the plunger to the open position, so that the valve is at an open state and the gap has a first width configured to allow a flow in the soft tube. In response to the electric current from the circuitry being a closing current, the plunger controller is configured to switch the plunger to the closed position, so that the valve is at a closed state and the gap has a second width configured to cut off the flow in the soft tube.

The above and other aspects and their implementations are described in details in the drawings, the descriptions, and the claims.

BRIEF DESCRIPTION OF THE DRAWINGS

The system, device, product, and/or method described below may be better understood with reference to the following drawings and description of non-limiting and non-exhaustive embodiments. The components in the drawings are not necessarily to scale. Emphasis instead is placed upon illustrating the principles of the disclosure. The patent or application file contains at least one drawing executed in color. Copies of this patent or patent application publication with color drawing(s) will be provided by the Office upon request and payment of the necessary fee.

FIG. 9B shows an embodiment of an arm including three wrists at exemplary states.

Figure 1A:
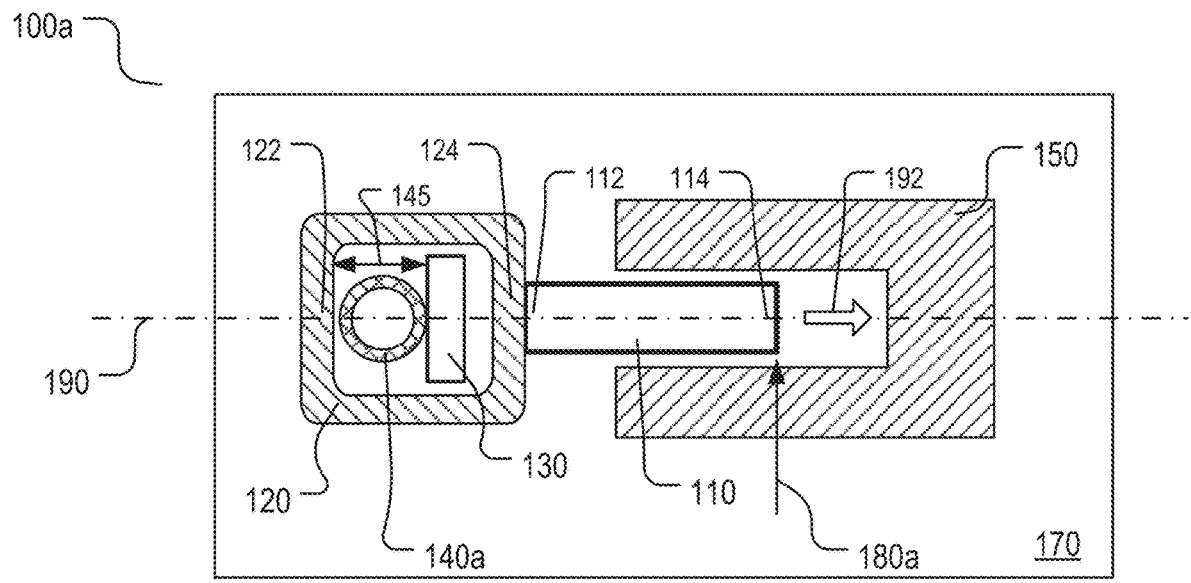
FIG. 1A is a schematic diagram for one embodiment of a vasoconstriction-like pinch valve at an open state.

While the present invention is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments above and claims below for interpreting the scope of the invention.

DETAILED DESCRIPTION

The device and methods now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Likewise, many modifications and other embodiments of the device and methods described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Unless defined otherwise, all technical and scientific terms used herein have the same meaning as commonly understood by one of skill in the art to which the invention pertains. Although any methods and materials similar to or equivalent to those described herein may be used in the practice or testing of the present invention, the preferred methods and materials are described herein.

The present disclosure describes devices, systems, and methods of a vasoconstriction-like pinch valve for localized flow control. The vasoconstriction-like pinch valve may include an embeddable micro pitch valve (EMPV), which may be light and small to be utilized in many kinds of actuator.

Development of robots partially or completely made of soft material enables their wide applications, partially due to their intrinsic safety to human and the environment. Soft robots may use some types of actuators, including pneumatic or hydraulic actuators (Fluid-driven), electroactive polymer (EAP) actuators, and shape memory alloy (SMA) actuators. Fluid-driven actuators may be made larger and may be more powerful comparing to other two types of actuators, so they may be used in most soft robots that show practical applications.

In soft robots including fluid-driven actuators, controlling the pressure in each actuator is the basic approach to control the fluid-powered soft robots. A few problems and/or issues associated with some types of fluid-driven actuators. One of the problems and/or issues is that a soft robot may include multiple bunches of tubes connecting multiple actuators to multiple valves behind the scene, making the robot looks like a marionette. The multiple tubes may become a problem when more actuators are added to a robot and the size of the robot need to be optimized. Tubes may only bend within limited radius, and when several tubes are packed together, a bundle of tubes may become less flexible. Using narrower tubes allows more tubes to be packed in a certain space, and one of the associated problems and/or issues may be that a flow rate (proportional to $d^4$ according to the Hagen-Poiseuille law, d being the inner diameter of the tube) under the same pressure decreases dramatically as the tube diameter decreases, resulting in significant decrease of action speed of the soft robots. Another problem/issue associated with narrow tubes with flexible thin-wall tubes is that the narrow tubes with flexible thin-wall tubes may have low-pressure rating and may not sustain high-pressure flow. These problems and/or issues with these types of fluid-driven actuators may impose more challenges for the development of soft robots.

Increasing the degree of freedom (DOF) is necessary for soft robots to complete complex tasks. In one design of a soft robot made of linked sections, e.g. soft robot arms, all the tubes may be fixed in the center axis. This kind of soft robot arm may have fixed length with one or two DOF for each section, so the tubes only needs to bend with the arm. Some other designs may arrange the tubes in a zigzag shape, allowing elongation and contraction along the axis. In either design, the existence of the tubes may influence the performance of the robot, and for every section append to the arm, numbers of new tubes starting from the base and going through the entire arm to reach that section may be arranged. One of the problems with such designs is the issue of scalability. Most valves for high-pressure applications may have heavy metal frame, too heavy for the robots to carry.

There are smaller valves for low-pressure applications, but they may need to be fastened on solid pieces and extra sealing may be required. In some designs, simple robots carrying valves and pressure source may be made to build an autonomous soft robotic fish with one degree of freedom, carrying control circuit, valves and a miniature $CO_2$ cylinder inside; in other designs, a large, untethered soft robot may be made with four 1-DOF legs that carries both valves and micro air compressors. At least one problem associated with these design may be that the robots may have fewer DOFs, and the control components may take a large part of the robot.

The present disclosure describes various embodiments of vasoconstriction-like pinch valve for localized flow control to address at least some of the problems/issues discussed above. The present disclosure describes some embodiments of embeddable micro pitch valve (EMPV), which is light, small and simple while capable of locally controlling the pressure of every actuator with a relatively low and safe voltage (e.g., 5 V). The EMPV may address at least the scalability problem of soft robots. The EMPV may control the cross-section area of a flow channel of a soft tube by squeezing the soft channel from outside. The embodiments has several advantages over other systems, for example but not limited to, no part of the valve is directly exposed to the pressure of the flow, no sealing is required for the shell of the valve, EMPVs may be easily embedded into the robot, EMPV may be made by either 3D-printing or molding.

The present disclosure also describes embodiments of a modular soft robot arm using EMPV-based hybrid actuators. The arm may be composed of plug-and-play wrist modules, making it configurable for different tasks and easy to repair.

Figure 1B:
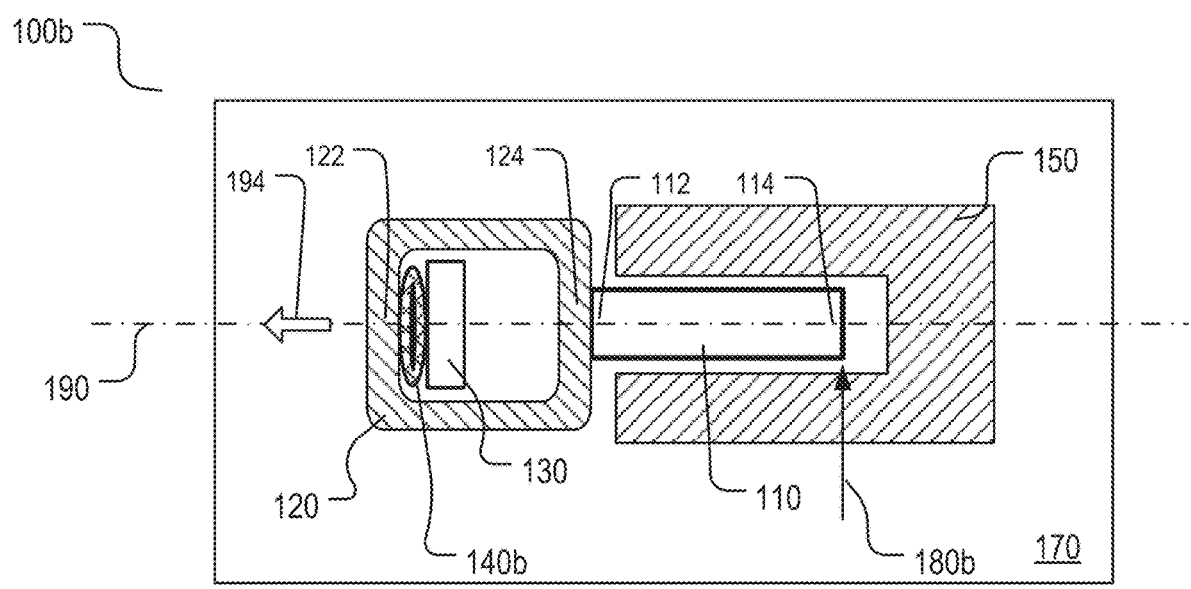
FIG. 1B is a schematic diagram for the vasoconstriction-like pinch valve in FIG. 1A at a closed state.

Referring to FIGS. 1A and 1B, embodiments of a vasoconstriction-like pinch valve for localized flow control are described. FIG. 1A shows the valve at an open state 100a wherein a soft tube has an open shape 140a; and FIG. 1B shows the value at a closed state 100b wherein the soft tube has a closed shape 140b. In some implementations, a fluid inside the soft tube may have a higher pressure than outside the soft tube, and the fluid flows in the soft tube. The fluid may include a liquid and/or a gas. The gas may include, for example but not limited to, an air, a nitrogen gas, and an inertial gas. The liquid may include, for example but not limited to, water and oil. In some implementations, an inside of the soft tube may have a lower pressure than an outside of the soft tube, for example, the soft tube may be connect to a vacuum machine to draw a fluid or gas through the soft tube.

The valve may include a plunger 110 and a plunger controller 150. The plunger may be slidable along a longitudinal axis 190. The plunger has a proximal end 112 and a distal end 114. The plunger controller 150 encloses the distal end 114 of the plunger and configured to slide the plunger between an open position 180a and a close position 180b along the longitudinal axis.

The valve may also include a gate 120. The gate may be fixedly connected to the plunger so that the gate moves together with the plunger when the plunger slides. The gate has a proximal end 122 and a distal end 124. The distal end 124 of the gate is fixedly connected with a proximal end 112 of the plunger 110.

The valve may also include a spacer 130. The spacer 130 may be fixed so that the spacer 130 does not move when the plunger slides. The proximal end 122 of the gate and the spacer 130 forms a gap, and a width 145 of the gap changes when the plunger and the gate slides together. In this disclosure, the "width" of the gap may refer to the spatial distance between the proximal end 122 of the gate and the spacer 130 along the longitudinal axis 190. In one implementation, the valve may optionally include a substrate 170, and the spacer 130 and the plunger controller are fixedly disposed on the substrate 170. In one implementation, the spacer 130 may include a flat surface towards the proximal end 122 of the gate. In another implementation, the proximal end 122 of the gate may include a flat surface towards the spacer 130.

When the valve is at the open state 100a, the plunger is at the open position 180a and the gap has a first width. The first width may be about or slightly smaller than an outer diameter of the soft tube, so that the soft tube has an open shape 140a to allow the fluid flow in the soft tube. The plunger controller 150 may receive a control signal indicating whether to switch the valve to an open state or a closed state.

Upon receiving the control signal indicating to switch the valve from the open state 100a to the closed state 100b, the plunger controller may exert a closing force on the plunger to slide the plunger towards a closing direction 192. The closing force may have a direction towards the closing direction 192. The closing force may be generated by one or a combination of various means, for example but not limited to, a magnetic force by a permanent magnet, a solenoid with an electric current, a spring under tension, or the like. The closing force may be sufficient to overcome the elasticity force of squeezing the soft tube from the open shape 140a to the closed shape 140b, and to overcome the pressure force of a pressure difference between inside and outside the tube.

When the valve is at the closed state 100b, the plunger is at the close position 180b, and the gap has a second width. The second width is smaller than the first width. The second width may be about or slightly smaller than twice a thickness of the soft tube wall. The gap is configured to deform the soft tube into a closed shape 140b to cut off the flow in the soft tube. The plunger controller may exert a holding force on the plunger to keep the soft tube at the closed shape 140b. The holding force may have a direction towards the closing direction 192. The holding force may be generated by one or a combination of various means, for example but not limited to, a magnetic force by a permanent magnet, a solenoid with an electric current, a spring under tension. In this disclosure, "about" a value may refer to a range between 90% and 110% of the value, inclusive.

Upon receiving the control signal indicating to switch the valve from the closed state 100b to the open state 100a, the plunger controller may allow the plunger moving toward an opening direction 194. In some implementations, the plunger controller may generate an opening force to slide the plunger towards an opening direction 194. The opening force may have a direction towards the opening direction 194. The opening force may be generated by one or a combination of various means, for example but not limited to, a magnetic force by a permanent magnet, a solenoid with an electric current, a spring under tension, or the like. In some implementations, the plunger controller may decrease the holding force (or stop the holding force), so that the plunger may slide towards the opening direction 194 under the elasticity force of the squeezed soft tube at the closed shape 140b and/or the pressure force of the pressure difference between inside and outside the tube.

Figure 2A:
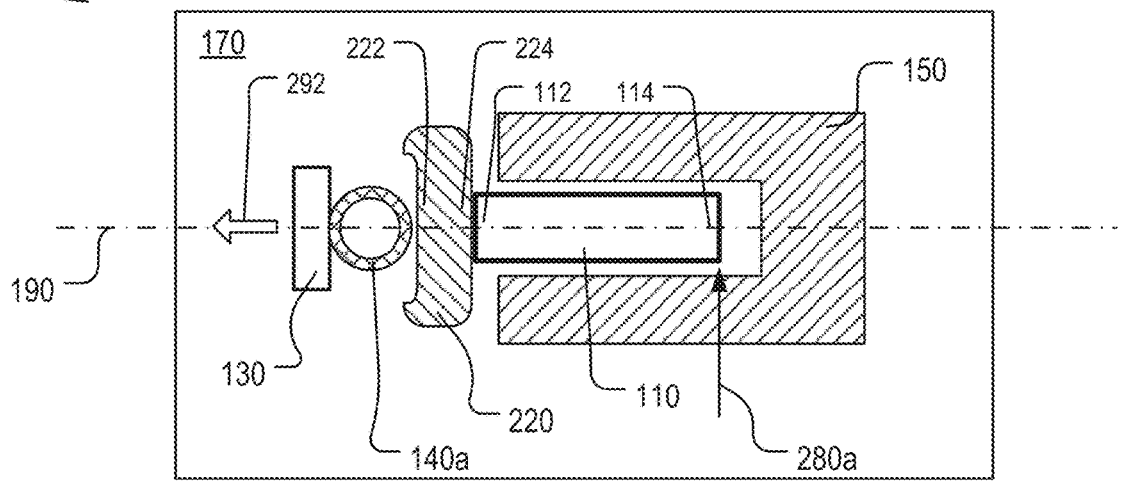
FIG. 2A is a schematic diagram for another embodiment of a vasoconstriction-like pinch valve at an open state.
Figure 2B:
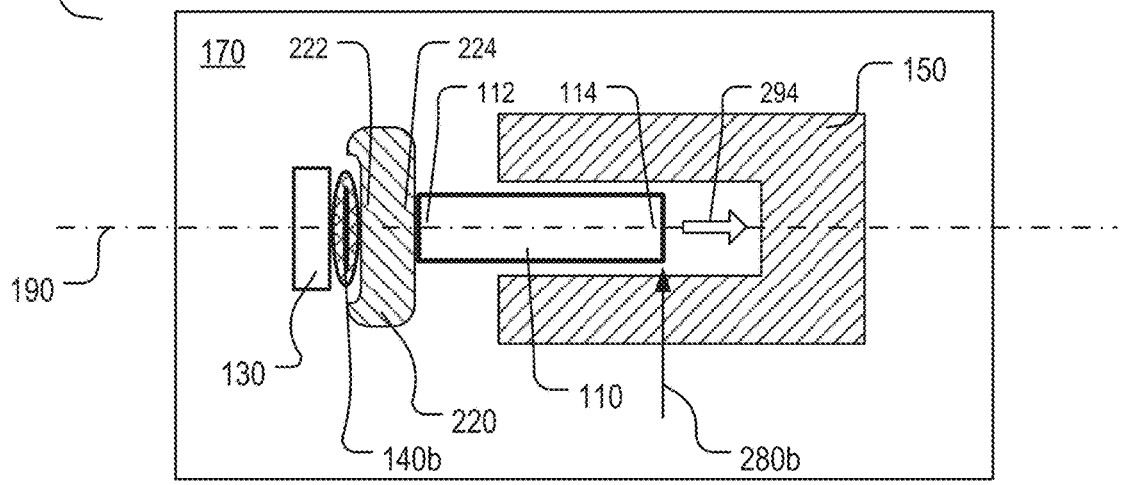
FIG. 2B is a schematic diagram for the vasoconstriction-like pinch valve in FIG. 2A at a closed state.

FIGS. 2A and 2B shows another embodiment of a vasoconstriction-like pinch valve for localized flow control. The valve may be at an open state 200a or at a closed state 200b. The valve may include a gate 220 having different structure compared with the gate 120 in FIG. 1A. The gate 220 includes a proximal end 222 and a distal end 224. The distal end 224 of the gate is fixedly connected to the plunger 110. The soft tube is disposed in a gap between the spacer 130 and the proximal end 222 of the gate.

When the valve is at the open state 200a, the plunger is at an opening position 280a and the gap has the first width. The soft tube has an open shape 140a to allow the fluid flow in the soft tube.

Upon receiving the control signal indicating to switch the valve from the open state 200a to the closed state 200b, the plunger controller may exert a closing force on the plunger to slide the plunger towards a closing direction 292. The closing force may have a direction towards the closing direction 292. The closing force may be generated by one or a combination of various means, for example but not limited to, a magnetic force by a permanent magnet, a solenoid with an electric current, a spring under tension, or the like. The closing force may be sufficient to overcome the elasticity force of squeezing the soft tube from the open shape 140a to the closed shape 140b, and to overcome the pressure force of a pressure difference between inside and outside the tube.

When the valve is at the closed state 200b, the plunger is at the close position 280b, and the gap has the second width. The soft tube has a closed shape 140b to cut off the flow in the soft tube. The plunger controller may exert a holding force on the plunger to keep the soft tube at the closed shape 140b. The holding force may have a direction towards the closing direction 292. The holding force may be generated by one or a combination of various means, for example but not limited to, a magnetic force by a permanent magnet, a solenoid with an electric current, a spring under tension, or the like.

Upon receiving the control signal indicating to switch the valve from the closed state 200b to the open state 200a, the plunger controller may allow the plunger moving toward an opening direction 294. In some implementations, the plunger controller may generate an opening force to slide the plunger towards an opening direction 294. The opening force may have a direction towards the opening direction 294. The opening force may be generated by one or a combination of various means, for example but not limited to, a magnetic force by a permanent magnet, a solenoid with an electric current, a spring under tension, or the like. In some implementations, the plunger controller may decrease the holding force (or stop the holding force), and the plunger may slide towards the opening direction 294 under the elasticity force of the squeezed soft tube at the closed shape 140b and/or the pressure force of the pressure difference between inside and outside the tube.

Below, the present disclosure will describes some exemplary embodiments according to FIGS. 1A and 1B. Exemplary embodiments according to FIGS. 2A and 2B may be constructed similarly.

Figure 3A:
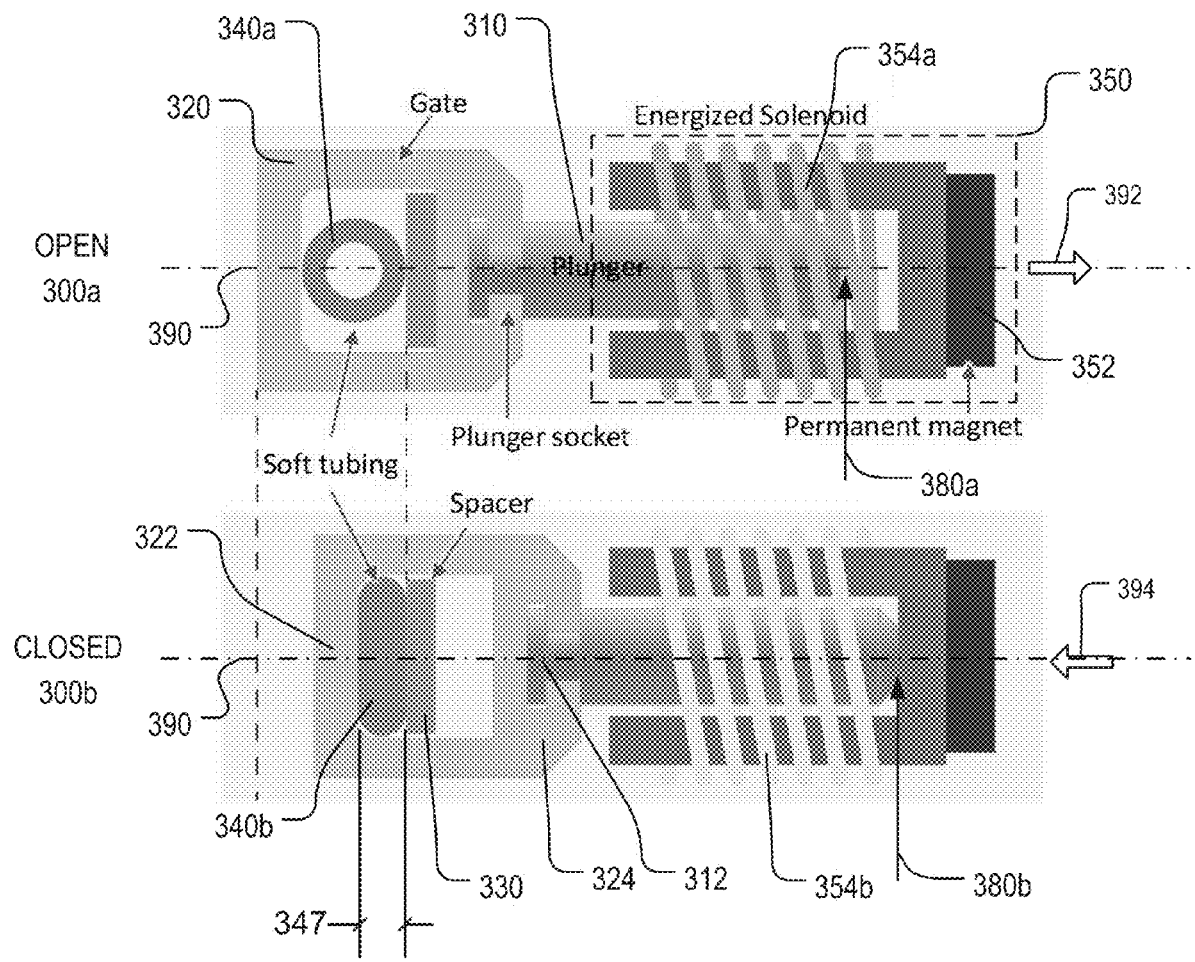
FIG. 3A is a schematic diagram for another embodiment of a vasoconstriction-like pinch valve at an open state and a closed state.

Referring to FIG. 3A, the present disclosure describes one embodiment of a vasoconstriction-like pinch valve for localized flow control. The valve may be at an open state 300a including a soft tube with an open shape 340a or at a closed state 300b including the soft tube with a closed shape 340b. The valve may include a plunger 310, a gate 320, and a spacer 330. A proximal end 312 of the plunger 310 may include a plunger socket, which fixedly engages with a distal end 324 of the gate 320. The soft tube is disposed between the spacer 330 and a proximal end 322 of the gate 320.

A plunger controller 350 of the valve may include a solenoid (at an energized state 354a or an un-energized state 354b) and a permanent magnet 352 at an end. For example but not limited to, the permanent magnet 352 may include a neodymium magnet. The plunger may include a ferromagnetic material, such as steel or iron. The plunger controller 350 may exert a force or a set of forces on the plunger to slide the plunger between an open position 380a and a closed position 380b. In another implementation, the plunger may include a shape-memory material including a shape memory alloy.

The set of forces may include a magnetic attraction force and a solenoid force. The magnetic attraction force between the permanent magnet 352 and the plunger 310 has a direction towards a closing direction 392. The magnetic attraction force decreases as the plunger 310 slides further away from the permanent magnet 352.

The solenoid force on the plunger may be generated by the solenoid when an electric current flows through a coil of the solenoid. A force direction and a force magnitude of the solenoid force may depend on a direction and a magnitude of the electric current, respectively. The larger of the magnitude of the electric current, the larger of the force magnitude of the solenoid force. When the electric current reverses its direction, the solenoid force may reverse direction accordingly.

Figure 3B:
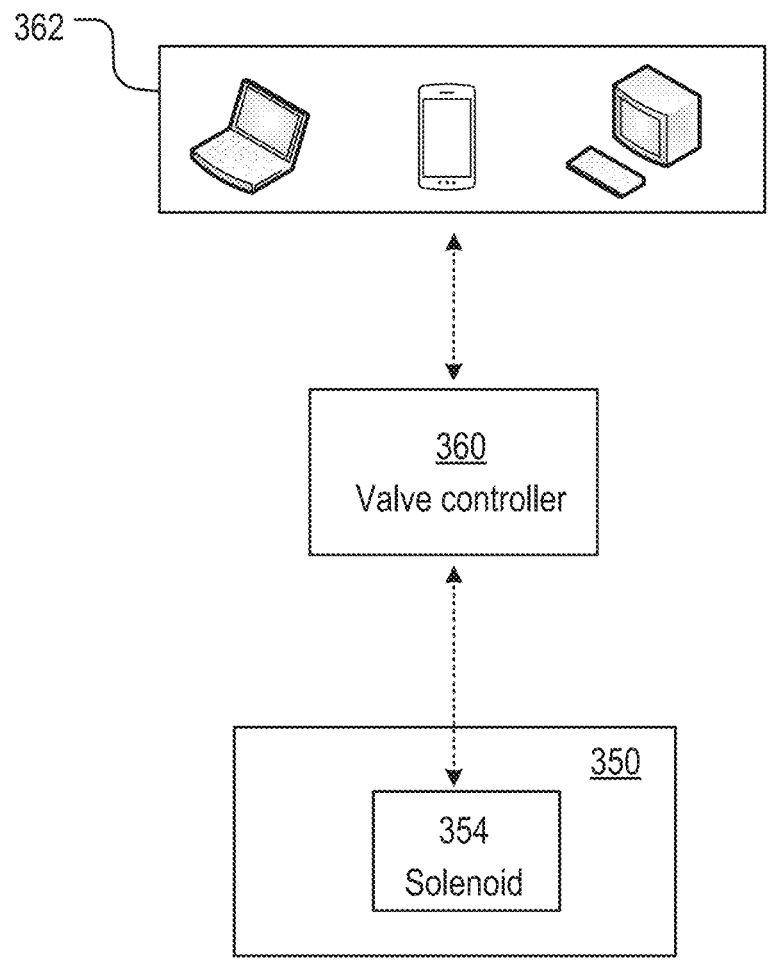
FIG. 3B is a schematic diagram for some embodiments of an electronic device controlling a vasoconstriction-like pinch valve.

Referring to FIG. 3B, the electric current to the solenoid 354 may be supplied by a valve controller 360. The valve controller 360 may supply an electric current or voltage to control the solenoid 354, and thus control the valve. Optionally, in some implementations, the valve controller 360 may communicate and/or receive command signal from an electric device 362. The electric device may include, for example but not limited to, a system on a chip (SoC), a micro control unit (MCU), a programmable gate array (PGA), a laptop, a smartphone, a desktop computer, or a server.

Figure 4A:
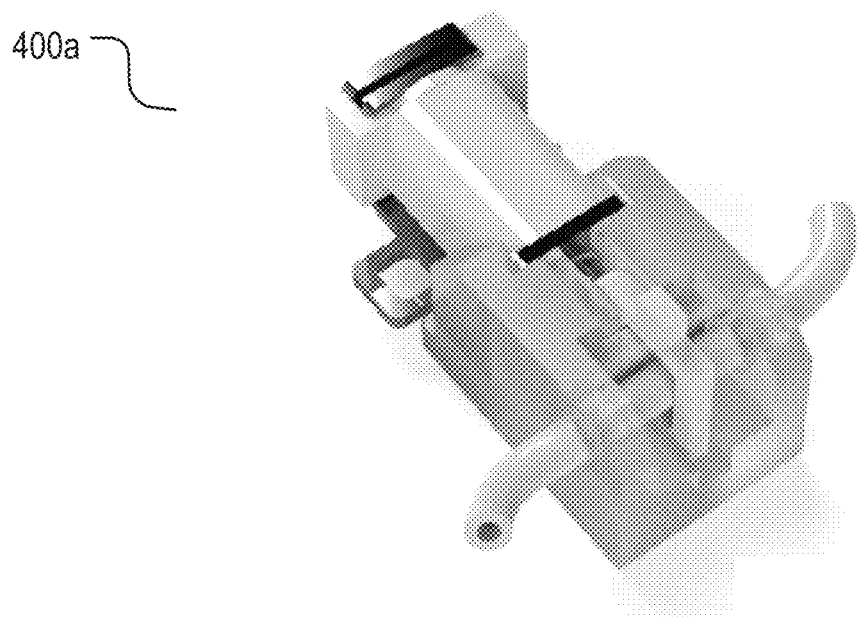
FIG. 4A illustrates a vasoconstriction-like pinch valve at an open state.

When the valve is at the open state 300a, the plunger is at the open position 380a, the soft tube has an open shape 340a, and the liquid may flow in the soft tube. FIG. 4A illustrates a vasoconstriction-like pinch valve at an open state 400a. When the valve is at the closed state 300b, the plunger is at the closed position 380b, the soft tube has a closed shape 340b, and the liquid may not flow in the soft tube. FIG. 4A illustrates a vasoconstriction-like pinch valve at a closed state 400b. The valve may have dimensions including a length 476, a width 474, and a height 472.

Referring to FIG. 3A, the valve may include an embeddable micro pitch valve (EMPV). A basic working principle of the EMPV may be, according to a voltage applied to the valve, to squeeze the soft tube to cut off a liquid flow and/or release the soft tube to allow the liquid flow. The solenoid may have a small size and may be controlled by a low-voltage integrated circuit. The solenoid may generate enough force for tube-squeezing task. Shape memory alloy (SMA) controlled by ohmic heating may generate enough force, but may consume a huge current due to its low resistance and have a slow cooling process. The solenoid and the magnet may have a miniature dimension and be one of the most suitable choices to generate the force in EMPV. In a robot system employing multiple EMPV-controlled actuators, the EMPVs may connect to arterial pressure supplies and locally control the pressure of the actuators. When a number of degree of freedom (DOF) increases, new actuators may be appended to the artery through EMPVs, requiring no extra tube. The present disclosure may solve the problem that the number of tubes grows with the increasing number of actuators in a soft robot.

Figure 4B:
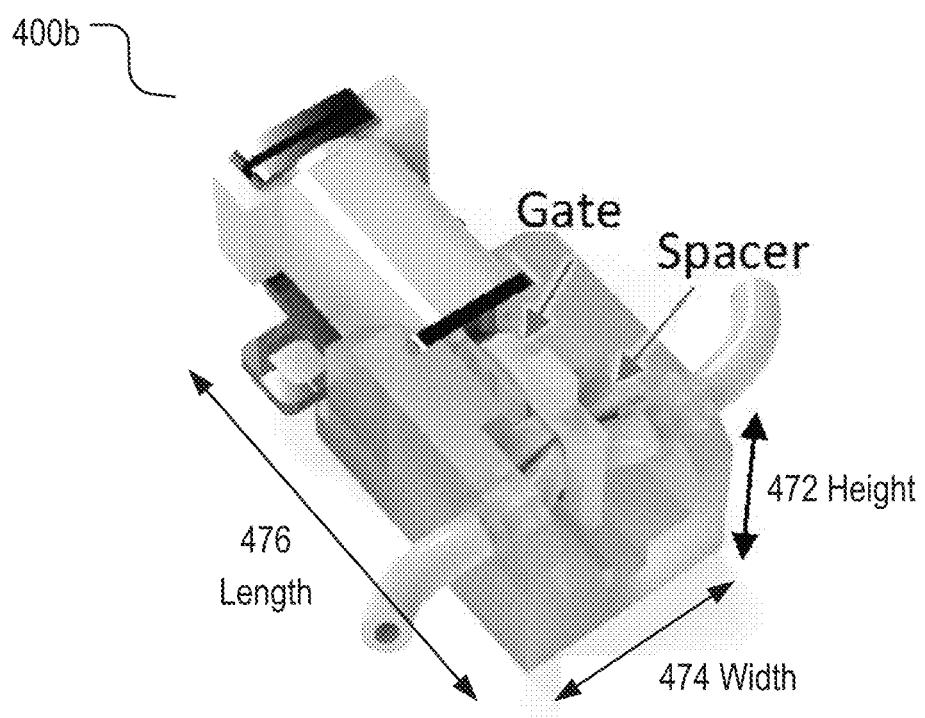
FIG. 4B illustrates a vasoconstriction-like pinch valve at a closed state.

In one implementation referring to FIG. 4B, the valve may include an off-the-shelf solenoid magnetic to make a tiny tube-squeezer with dimensions including a length from 1.8 mm to 18 mm, a width from 0.8 mm to 8 mm, and a height from 0.7 mm to 7 mm, inclusive. A weight of the valve may be from 2.5 milli-gram to 2.5 gram, inclusive. Referring to FIG. 3A, when the valve is at the closed state 300b, the permanent neodymium magnet 352 may attaches the steel plunger 310 with a holding force, for example, the holding force may be about 900 milli-Newton (mN). This holding force may keep the valve closed when there is no current in the coil; in another word, the valve may be normally closed without applied electric voltage/current.

Referring to FIGS. 3A and 3B, when the valve controller 360 receives a signal indicating to open the valve (e.g., switching the valve from the closed state 300b to the open state 300a), the valve controller may supply an electric voltage or current (i.e., an opening voltage or current) to the solenoid 354 to energize the solenoid. A magnetic field created by the energized solenoid may have opposite direction to the magnetic field of the permanent magnet 352, so as to cancel the magnetic field of the permanent magnet 352. Thus, the plunger may be released towards the opening direction 394. The gate may slide towards the opening direction 394 under the elasticity of the tube. In some implementations, the pressure difference inside and outside the tube may also induce the gate to slide towards the opening direction 394.

When the valve controller 360 receives a signal indicating to close the valve (e.g., switching the valve from the open state 300a to the closed state 300a), the valve controller may apply a reversed electric voltage or reversed current (i.e., a closing voltage or current) on the solenoid 354. The magnetic field created by the energized solenoid with reversed current may have the same direction as the magnetic field of the permanent magnet 352, so as to strengthen the magnetic field of the permanent magnet 352 to generate more force on the plunger towards the closing direction 392. In one implementation, the attraction force from the permanent magnet may decrease fast with distance, and may not be sufficient to pull back the plunger. For example, when the soft tube includes a silicone tube with a hardness of Shore durometer of 35A, an inside diameter (ID) of 1/32" (i.e., 1/32 inch), and an outside diameter (OD) of 1/16" (i.e., 1/16 inch), the elasticity of the soft tube may block the plunger from returning to the closed position when the pressure inside is higher than ambient. In another implementation, the magnetic field generated by the solenoid may tend to attract the plunger to a center-aligned position, and the force near balance may be small.

The combination of solenoid with permanent magnet in the present disclosure may solve at least some of the above problems. Once the plunger is near the closing position 380b, the attraction force from the permanent magnet 352 may become predominant. In one implementation, the solenoid 354 or the valve controller 360 may include an integrated H-bridge to control the direction and its reversed direction of the electric current.

Referring to FIG. 3A, a soft tube may be soft and elastic to completely block the flow when being squeezed to be at the closed shape 340b, and also be soft and elastic to restore to normal shape when the force is removed to be at the open shape 340a. For example but not limited to, the soft tube may include a silicone rubber tubing, and/or a fiber-enhanced tube. The fiber-enhanced tubes may be used when a higher pressure of fluid is used. The pressure rating of the tube may determine the burst pressure of the valve. In one implementation, the tube used in the following measurements may have a burst pressure above 200 kPa.

Referring to FIG. 3A, a maximum operating pressure is determined by a width 347 of a gap between the gate and the spacer when the valve at the closed state 300b. The smaller the gap, the larger the squeezing force due to the compression of the elastic tube. The minimal force required to stop a pressure may be calculated by $F_s=F_e+F_p$, where $F_s$ is a minimal squeezing force, $F_e$ is an elastic force and may be contributed from the elasticity of the tube, and $F_p$ is a pressure force and may be contributed from the pressure difference inside and outside the tube. For the same tubes, $F_e$ may be determined by the width of the gate at the closed state; $F_p$ may be determined by the geometry condition after squeezing.

Figure 5:
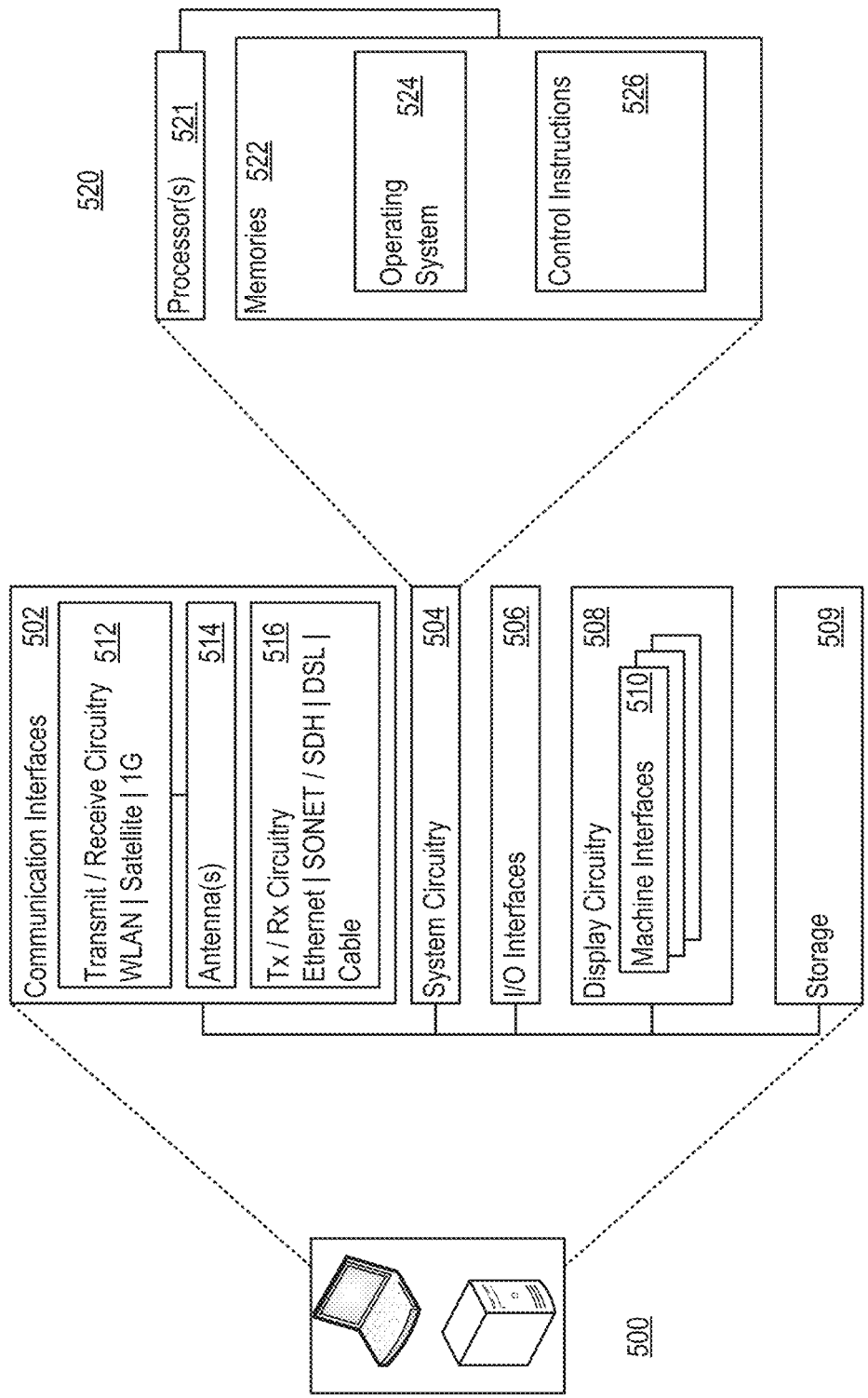
FIG. 5 is a schematic diagram of an electronic device.

FIG. 5 shows an exemplary device, for example, a computer system 500, for implementing the electric device 362 and/or the valve controller 360 in FIG. 3B. The computer system 500 may include communication interfaces 502, system circuitry 504, input/output (I/O) interfaces 506, storage 509, and display circuitry 508 that generates machine interfaces 510 locally or for remote display, e.g., in a web browser running on a local or remote machine. The machine interfaces 510 and the I/O interfaces 506 may include GUIs, touch sensitive displays, voice or facial recognition inputs, buttons, switches, speakers and other user interface elements. Additional examples of the I/O interfaces 506 include microphones, video and still image cameras, headset and microphone input/output jacks, Universal Serial Bus (USB) connectors, memory card slots, and other types of inputs. The I/O interfaces 506 may further include magnetic or optical media interfaces (e.g., a CDROM or DVD drive), serial and parallel bus interfaces, and keyboard and mouse interfaces.

The communication interfaces 502 may include wireless transmitters and receivers ("transceivers") 512 and any antennas 514 used by the transmitting and receiving circuitry of the transceivers 512. The transceivers 512 and antennas 514 may support Wi-Fi network communications, for instance, under any version of IEEE 802.11, e.g., 802.11n or 802.11ac. The communication interfaces 502 may also include wireline transceivers 516. The wireline transceivers 516 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 509 may be used to store various initial, intermediate, or final data or model. In one implementation, the storage 509 of the computer system 500 may be centralized or distributed, and may be local or remote to the computer system 500. For example, the storage 509 may be hosted remotely by a cloud computing service provider.

The system circuitry 504 may include hardware, software, firmware, or other circuitry in any combination. The system circuitry 504 may be implemented, for example, with one or more systems on a chip (SoC), application specific integrated circuits (ASIC), microprocessors, discrete analog and digital circuits, and other circuitry.

For example, the system circuitry 504 may be implemented as 520. The system circuitry 520 may include one or more processors 521 and memories 522. The memories 522 stores, for example, control instructions 526 and an operating system 524. The control instructions 526, for example may include instructions for implementing the components and/or functions of the electric device 362 in FIG. 3B. In one implementation, the processors 521 execute the control instructions 526 and the operating system 524 to carry out any desired functionality related to the control of the valve.

Figure 6A:
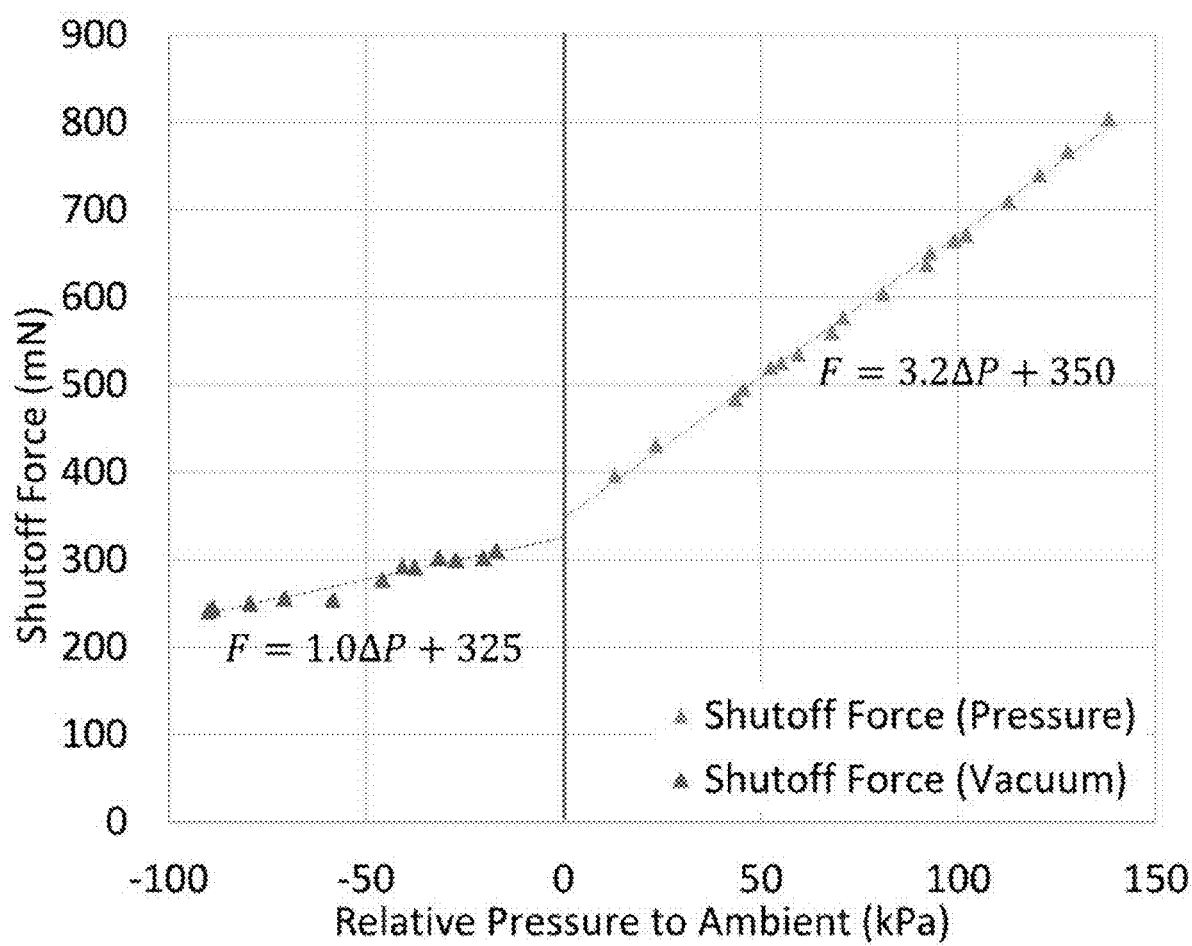
FIG. 6A illustrates a closing force for different inlet pressure, relative to ambient.

Referring to FIG. 6A, a minimal squeezing force may be measured under different relative operating pressure. The minimal squeezing force may have a linear relationship for positive and negative pressures with different slops. One of the explanations for the different slopes with a crossover may be that under positive pressure the tube is completely squeezed by the gate, thus may be considered as two flat plates; negative pressure may help the gate with some force, but the rest of the tube after the gate may be connected to the ambient, so when the gate tends to release the ambient side will open first and let in the flow. This may guarantee that as long as the negative pressure on both sides is not enough to collapse the tube, the mechanism of the EMPV still works. In one implementation, a vacuum source may be used for exhaustion, which means there is always a higher pressure on the other side.

Figure 6B:
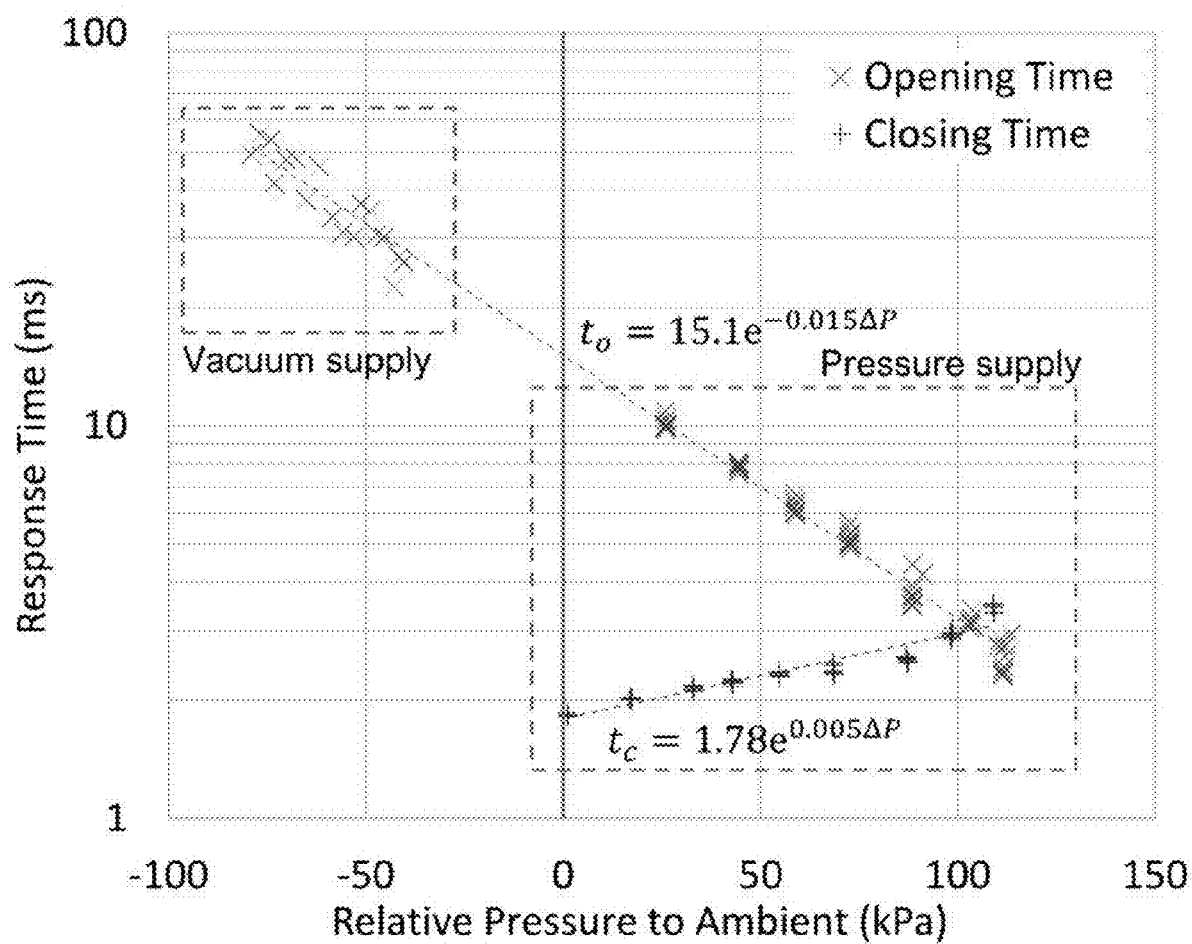
FIG. 6B illustrates a response time for different inlet pressure, relative to ambient.

Referring to FIG. 6B, a response time of an EMPV may be influenced by the pressure difference inside and outside the tube. During the opening process, the tube opens the gate on its own, so the higher the pressure inside the tube, the larger the force opening the gate, results in shorter opening response time ($t_o$). When the outlet of the EMPV is connect to ambient, $t_o$ decreases exponentially with the increasing of input pressure, and the relation is consistent for negative pressure from vacuum supply.

Figure 6C:
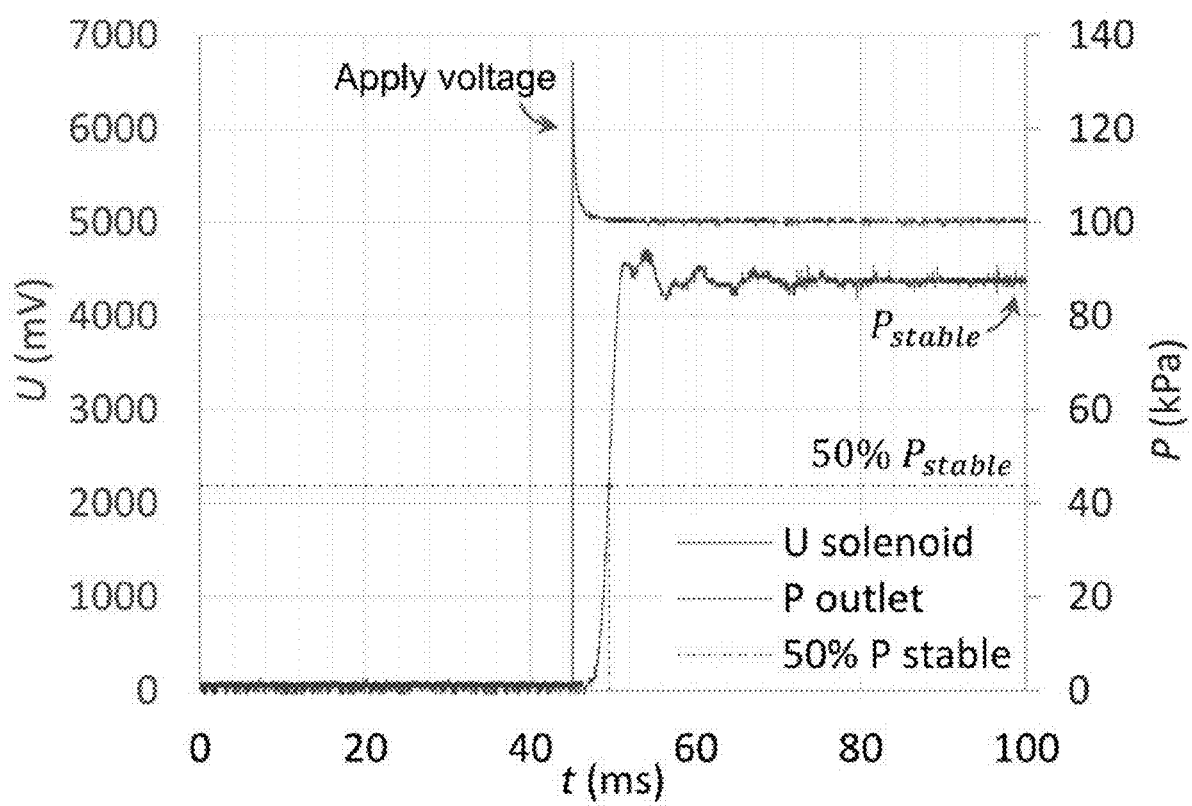
FIG. 6C illustrates a typical response curve of energizing an embeddable micro pitch valve (EMPV).
Figure 6D:
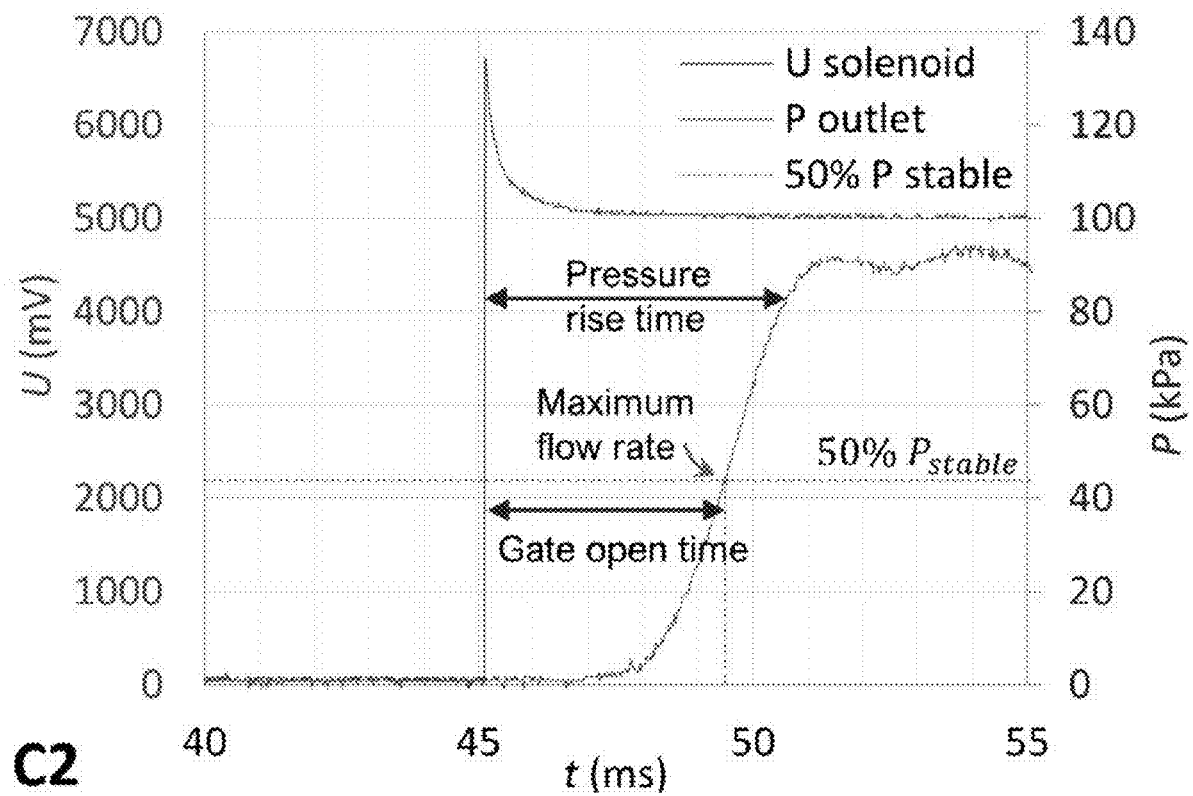
FIG. 6D illustrates a detailed energizing process as shown in FIG. 6C.

Referring to FIGS. 6C and 6D, after applying voltage to the solenoid, there may be a death time that the pressure does not change, after which the pressure rises in an "S" shape. It also takes some extra time for the outlet pressure become stable. The response time is measured as the outlet pressure reaches 50% of the stable pressure during the rising stage, where also locates the maximum flow rate. In one implementation, an average opening time of the EMPV is about 7 milli-second (ms).

Figure 6E:
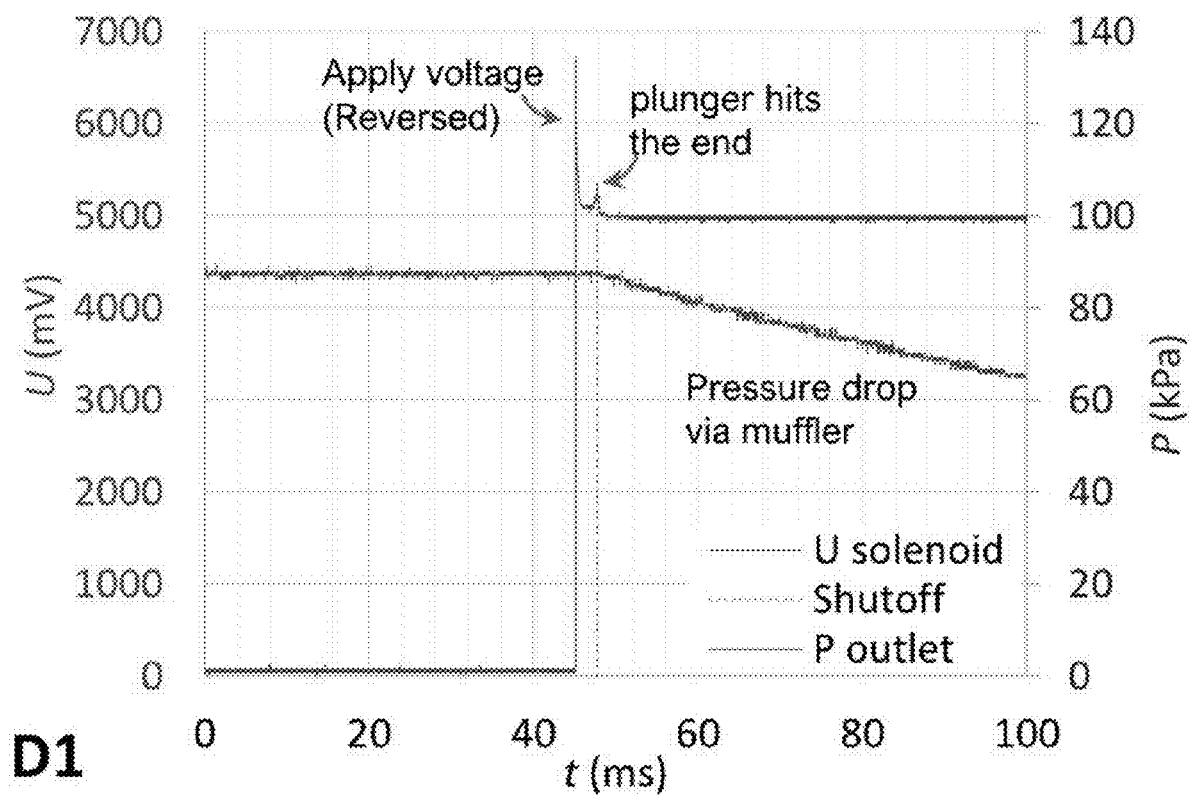
FIG. 6E illustrates a typical response curve of closing an EMPV by reversing current.
Figure 6F:
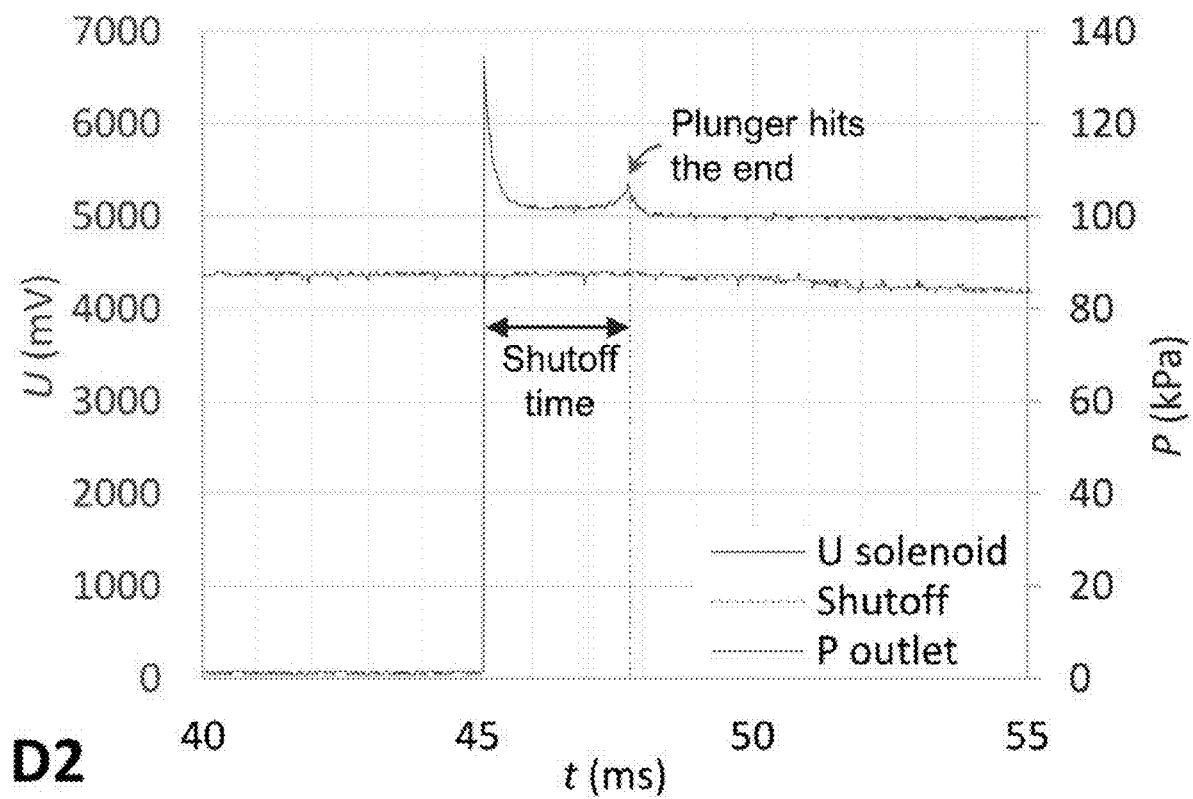
FIG. 6F illustrates details of closing process as shown in FIG. 6E.

Referring to FIG. 6B again, during the shutoff process, the force generated by the solenoid and the permanent magnet may dominate, therefor the closing response time ($t_c$) may be less affected by the pressure difference and generally faster. Referring to FIGS. 6E and 6F, unlike the opening process, shutting-off of the valve may not be reflected by the changing of the outlet pressure, so the closing response time is measured by the second peak of $U_{solenoid}$, which marks the vanishing of the reverse voltage from the increasing of the magnetic flux when the plunger hits the end. The time for pressure dropping may be limited by the exhausting speed, thus may not represent the closing time properly. Below the ambient pressure, the EMPV may shut off without the reversed current, which may make measuring $t_c$ by voltage signal impossible; and a response time may be assumed to be not longer than under positive pressure. The relatively fast closing response, for example <4 ms (millisecond), may make the valve capable of doing precise closed-loop control.

Figure 7A:
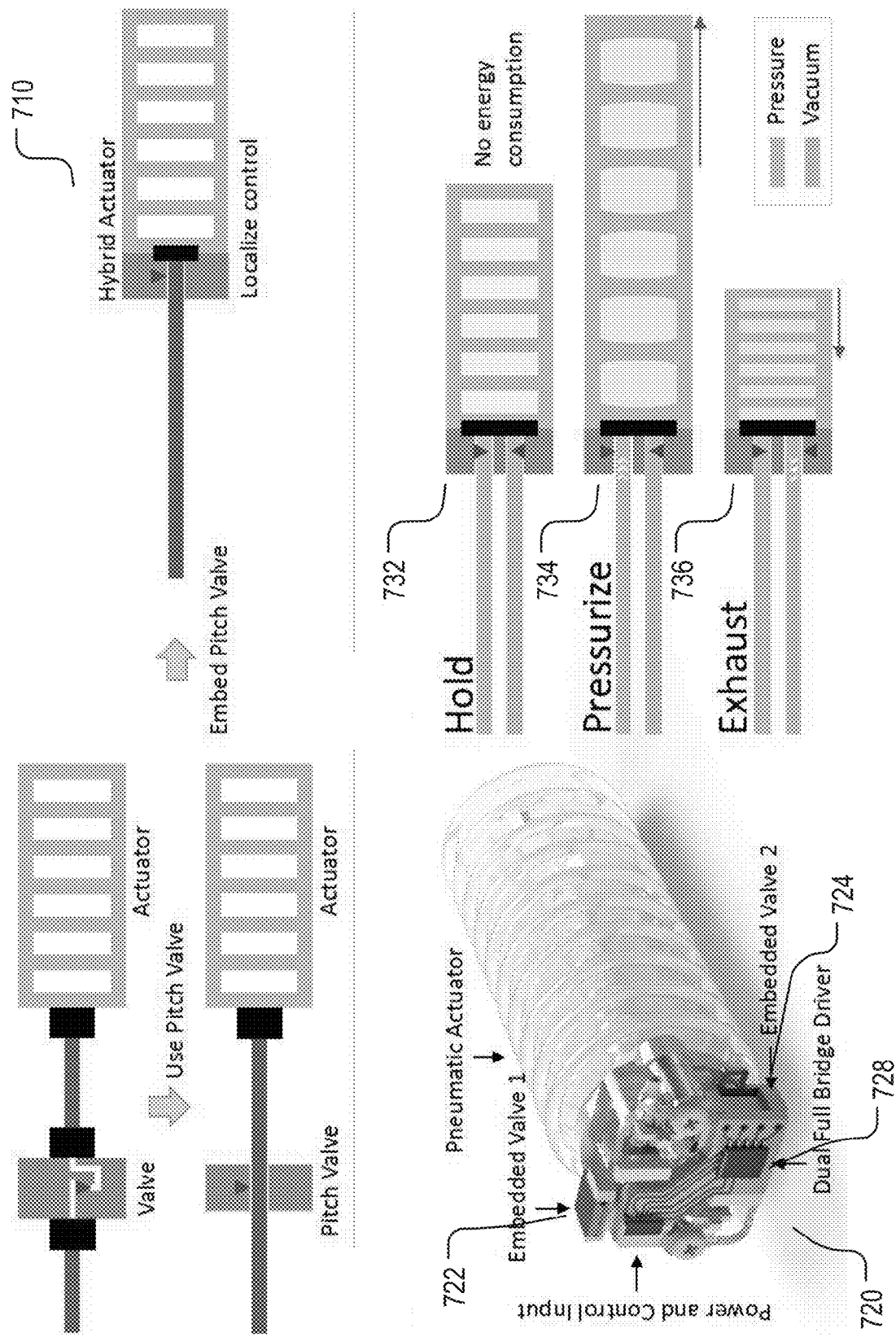
FIG. 7A shows a schematic diagram of a locally controlled hybrid actuator, an illustration of a rendered hybrid actuator, and a schematic diagram of a working principle of a local three-state controller (LTC).

The present disclosure describes various embodiments of hybrid actuators by integrating the EMPV onto soft actuators. Referring to FIG. 7A, a hybrid actuator 710 may be powered by pneumatic force and controlled by electric signals. Comparing to traditional setup, hybrid actuators may require less sealing, less space and simplifies the overall structure. The short response time of the EMPV plus the small channel volume may make the hybrid actuator be used in applications with precise control.

The actuator under closed-loop control may have three states: a holding pressure state 732, an inflating/pressurizing state 734, and a deflating/exhausting state 736. Traditional miniature valves containing one solenoid may have two states. One solenoid may only have two positions: for example, either open and close states for 2-way valves, or pressure and exhaust states for 3-way valves. A combination of two 2-way valves may achieve a three-state control. A three-state controlled actuator not only may be used in closed loop, but also improve the performance and energy efficiency of the robot. Actuators using only one valve may be connected to the pressure source all the time when powered, so all the powered actuators will interference each other through pressure re-balancing. This process may even become unstable if the actuator does not react to the pressure linearly. Single-solenoid driven valves may be mono-stable, the actuated state is kept by running current in the coil which only generates heat. With two normally closed valves, an actuator only consume energy when the pressure in the actuator need to change.

Referring to FIG. 7A, the present disclosure describes an embodiment of a hybrid actuator 720 with one silicone pneumatic spring and a local three-state controller (LTC). The LTC consists of two EMPVs (722 and 724) and a duel H-bridge driver 728. During the inflation or contraction of the actuator, the EMPV controlling the pressure or vacuum supply may open accordingly and pressurize or de-pressurize the chambers. When the pressure inside the actuator needs not to be changed, both EMPVs are in normal closed state 732 without consuming electric power. In one implementation, the frame of the valve, the channels and the connector to the actuator may be merged together and 3D-printed by resin as one piece.

Figure 7B:
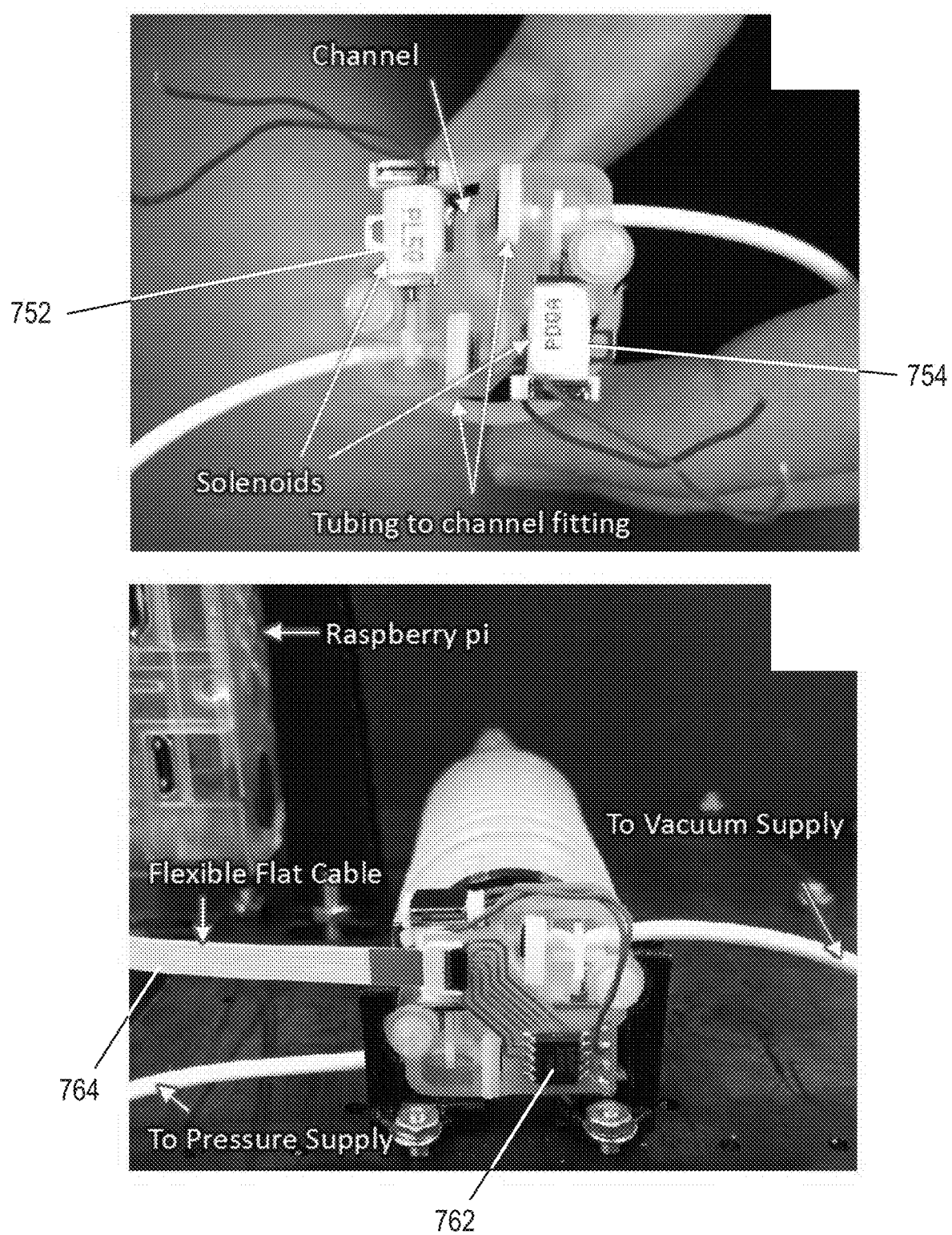
FIG. 7B shows photos of an actual LTC.

Referring to FIG. 7B, the EMPVs may be assembled on the controller. A duel H-bridge chip 762 connects to the controller via flexible flat cable (FFC) 764 and manipulate the current in the solenoids (752 and 754).

Figure 7C:
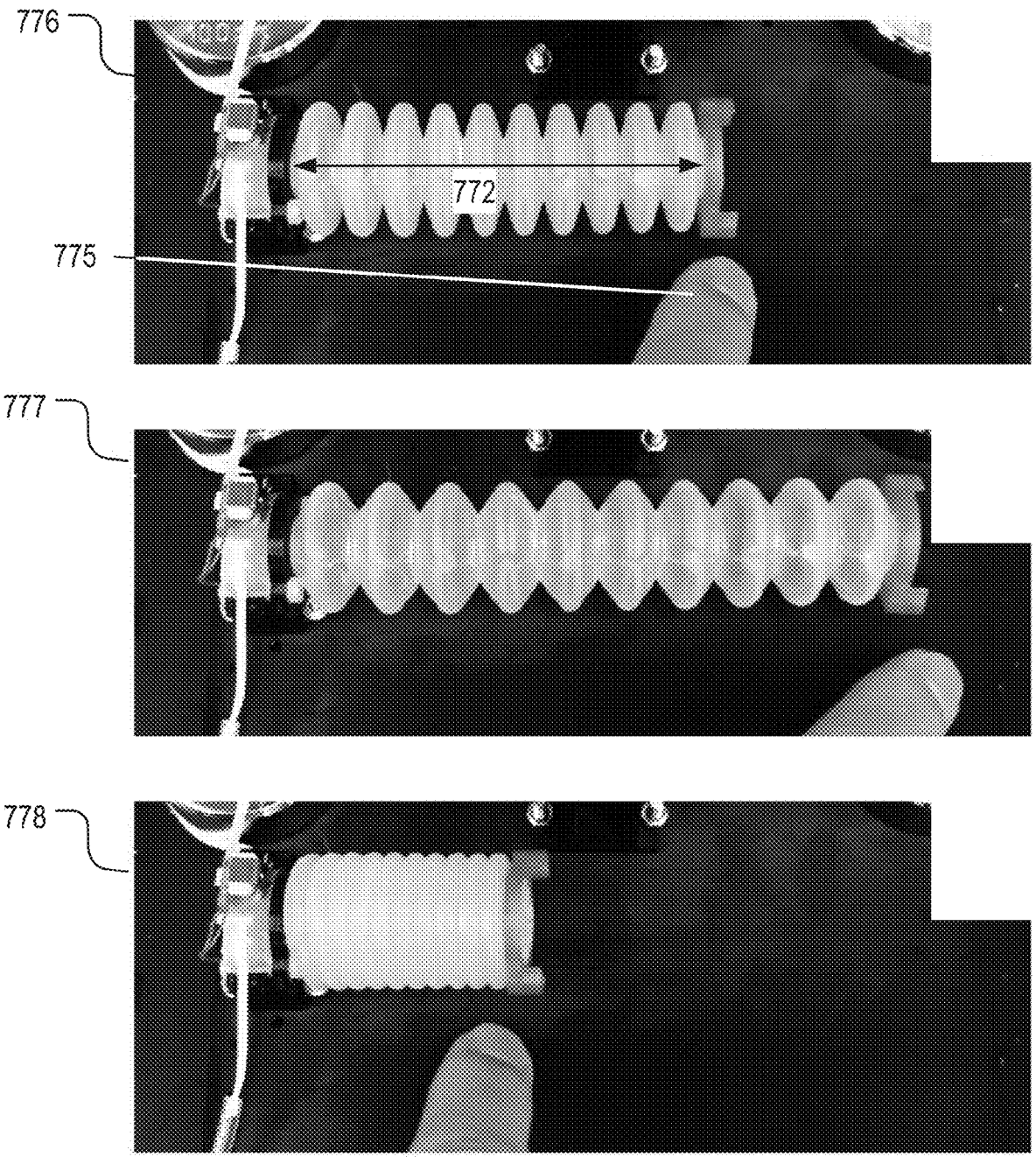
FIG. 7C demonstrates a hybrid actuator tracking a reference object (in this case, a finger)

Referring to FIG. 7C, the present disclosure describes a closed-loop control using camera feedback to demonstrate the controllability of the hybrid actuator. The hybrid actuator may be fixed on the plane. A camera disposed from above the hybrid actuator may track the length 772 of the actuator and a reference object (in this case a finger 775) and do a feedback control. The actuator in FIG. 7C may be in a hold state: both EMPVs are in closed positions, consuming no energy. The length 772 of the actuator may, under a closed-loop control, follow the position of the finger 775 in 776, 777, and 778.

Figure 8A:
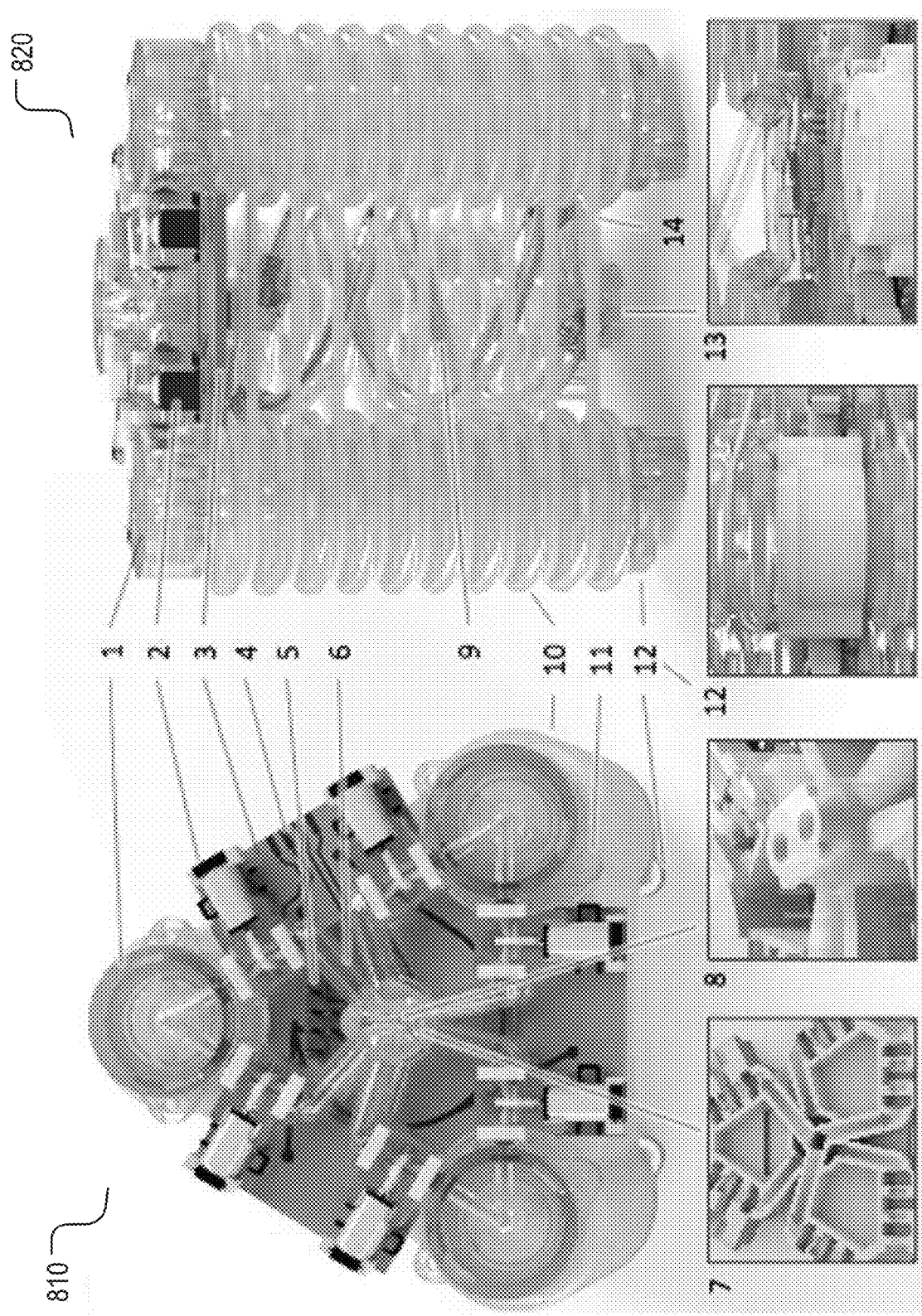
FIG. 8A illustrates a top view and a front view of a three degree of freedom (3-DOF) modular wrist including three hybrid actuators with low-profile TLCs.
Figure 8B:
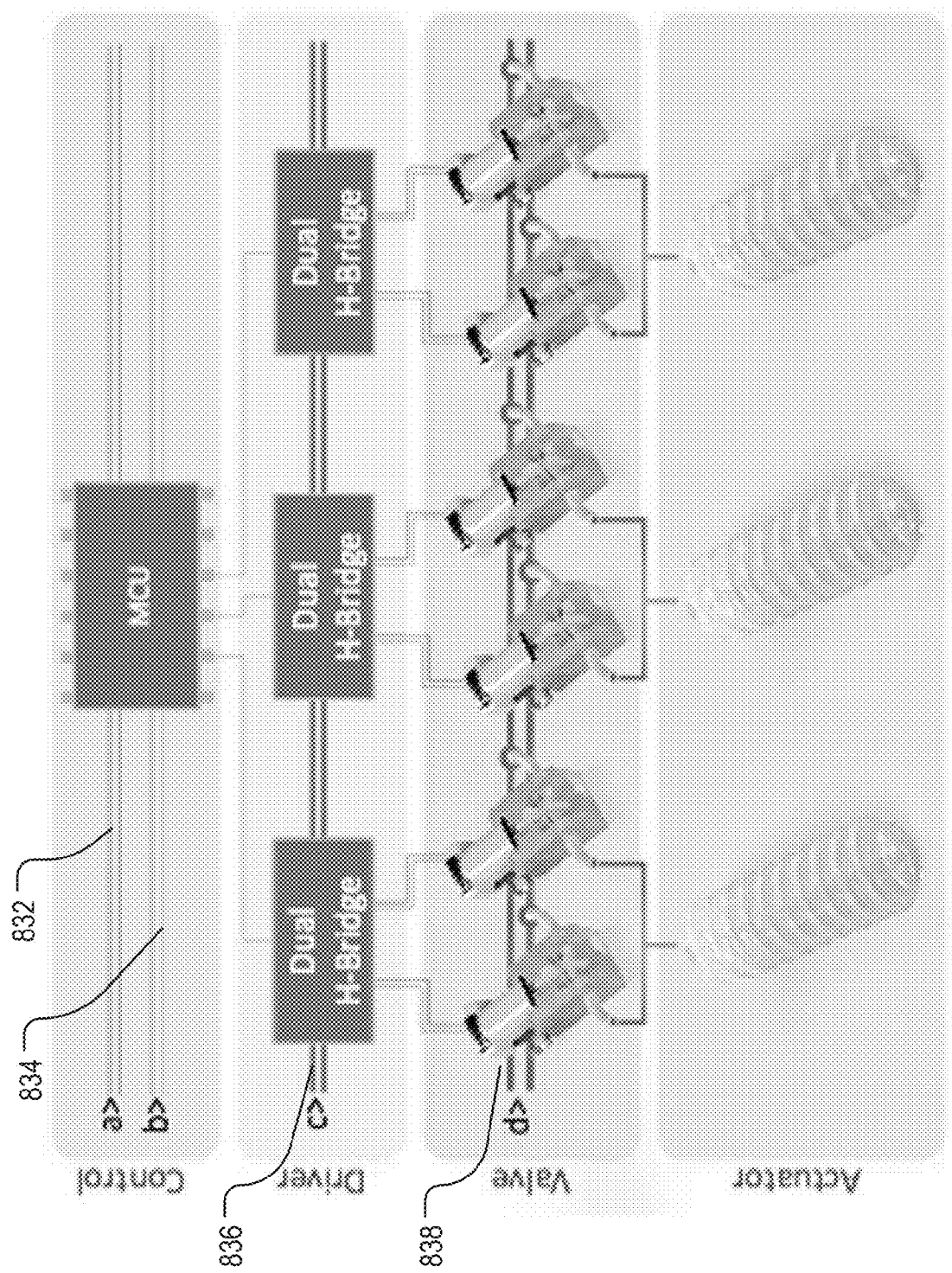
FIG. 8B is a schematic structure of a control circuit, EMPVs and actuators.
Figure 8C:
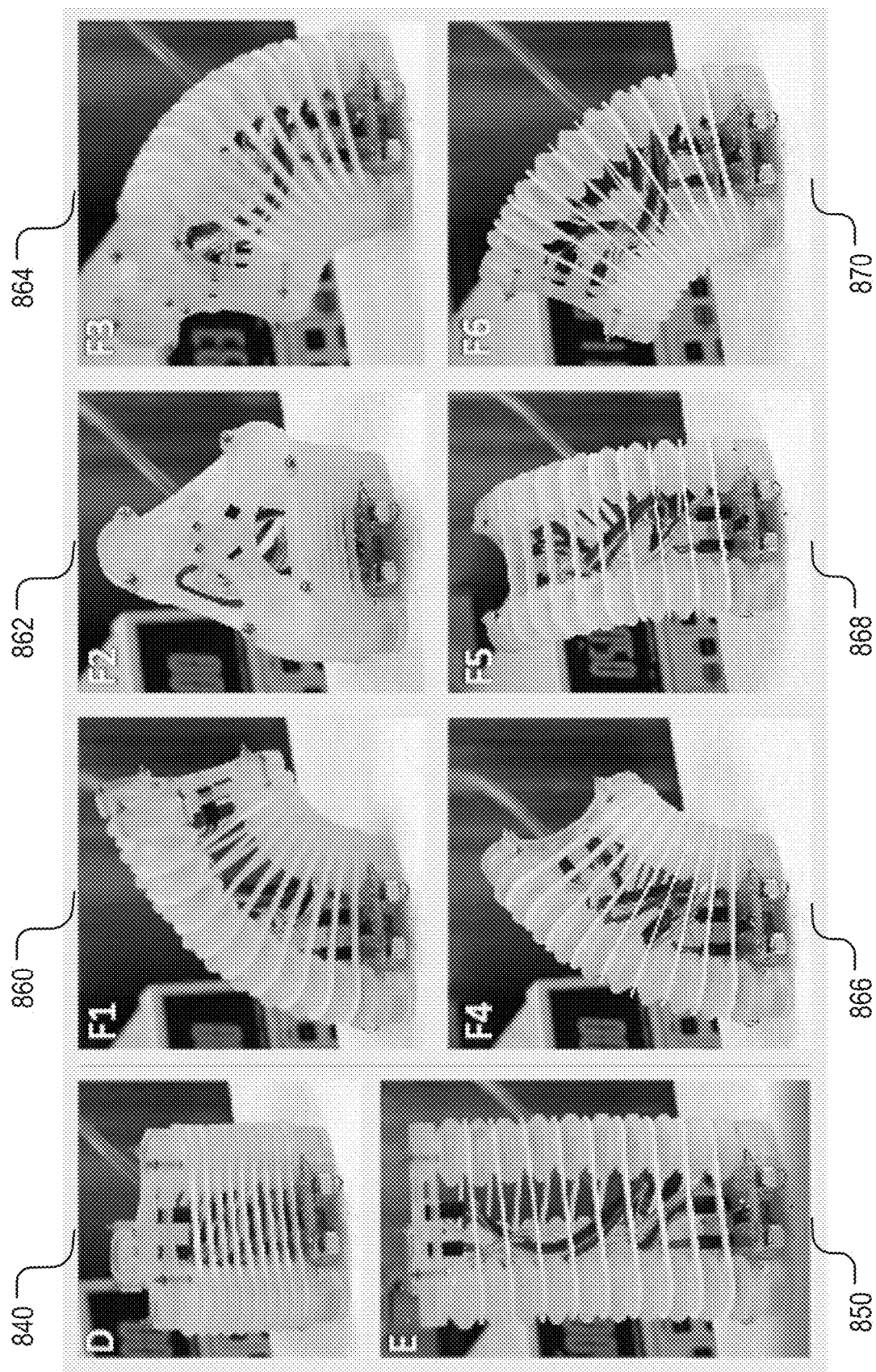
FIG. 8C shows photos of a wrist at a fully compressed state, a fully stretched state, and other states of bending to different directions.

Referring to FIGS. 8A, 8B, and 8C, the present disclosure describes various embodiments of three degree of freedom (3-DOF) modular soft robot wrist using a plurality of EMPV-based hybrid actuators. The modular soft robot wrist may have three independent hybrid actuators using low-profile LTC. Instead of placing the EMPVs along the axis, low-profile LTC may have both EMPV placed next to the actuator, reducing the dead length on the hybrid actuator and provide better heat dissipation.

FIG. 8A shows a top view 810 and a front view 820 of the modular soft robot wrist. The modular soft robot wrist may include a portion or all of the following: one or more actuator fittings 1, one or more EMPVs 2, one or more circuit board 3, one or more programming pins 4, one or more communication headers 5, one or more printed flow channels 6, one or more printed three-way dual-channel pressure distributors 7, one or more dual-channel pressure supply connectors 8, one or more arterial supply tubes in double helix shape 9, one or more actuators 10, one or more connectors to previous section and/or one or more connectors to next module 12, one or more pressure connectors to next module 13, and one or more ribbings used to confine the deformation of the actuators 14. The three actuators may be independent from each other and may be controlled independently. One or more ribbings may be used to confine their relative position. The communication wires and arterial pressure lines may go from the head to the end of the wrist in a helix shape and may link to next wrist afterwards. In one implementation, a complete assembly of the wrist may have a weight of about 110 gram, and the three hybrid actuators may provide three degree of freedom for the wrist.

Referring to FIG. 8B, a circuit containing all three duel H-bridge chips and a STM32 micro control unit (MCU) may be used to control the entire wrist. A schematic structure of the control circuit, EMPVs and actuators may include one or more power supplies for the MCU 832, one or more communication buses 834, one or more power supplies for solenoids 836, one or more pressure supplies 838.

FIG. 8C shows a modular soft robot wrist in a fully compressed state 840, a fully stretched state 850, and various different directions (860, 862, 864, 866, 868, and 870). The arterial supply and the communication wires do not confine the length of the wrist, this wrist can stretch to any length freely, for example, a shortest length at 840 and a longest length at 850.

Figure 9A:
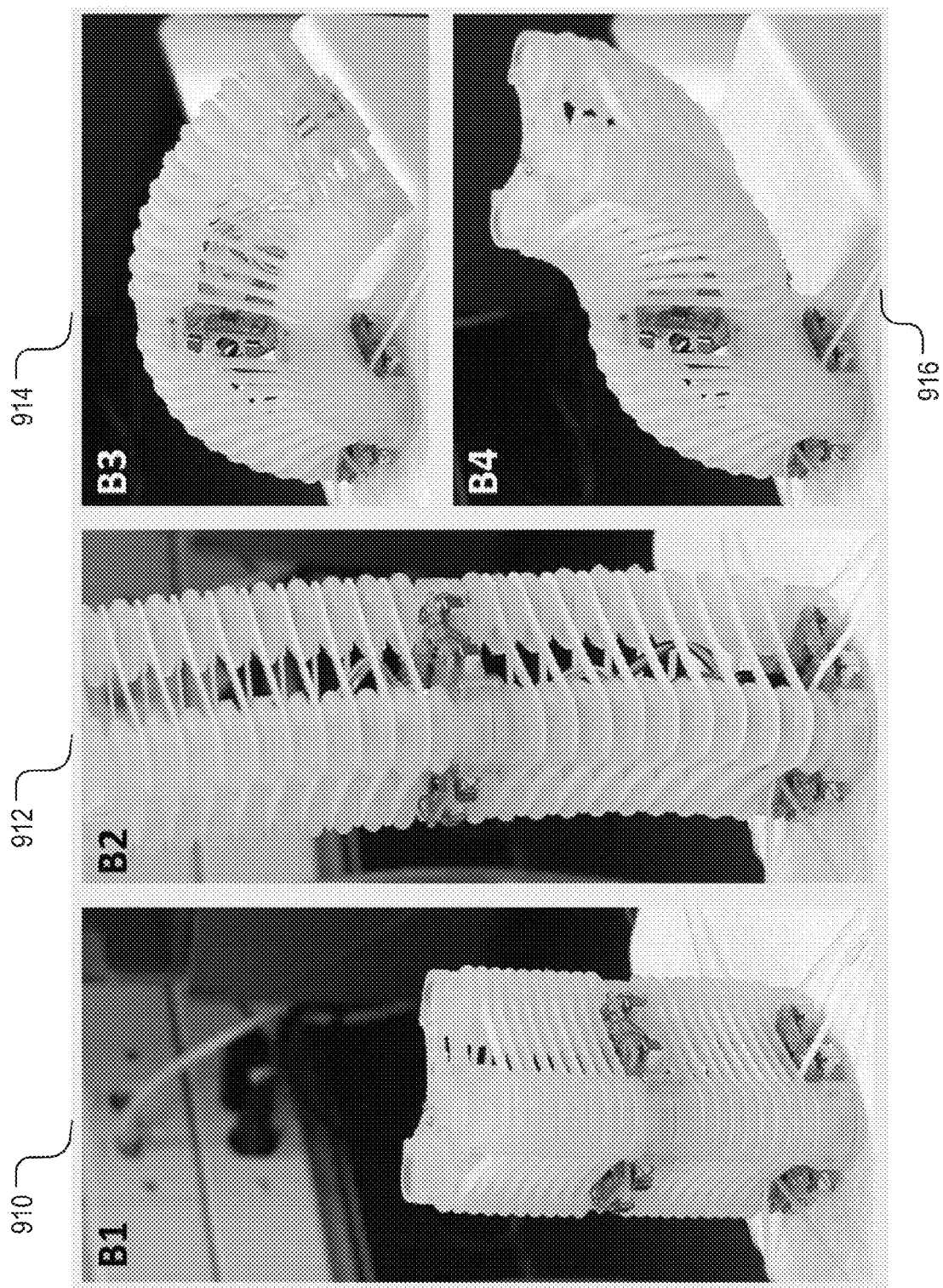
FIG. 9A shows an embodiment of an arm including two wrists at a fully compressed state, a fully stretched state, and other various states.

Referring to FIGS. 9A-9D, the present disclosure describes various embodiments of a soft robot arm including more than one 3-DOF modular soft robot wrists. In the soft robot arm, pressure supplies and communication wires may link in serials; and more than one twists may work together with very simple assembling. FIG. 9A shows a modular soft robot arm including two modular soft robot wrists in a fully compressed state 910, a fully stretched state 912, a state wherein the two modules bend towards the same direction 914, and a state wherein the two modules bend towards opposite directions 916. The wrists on an arm may receive the command from a central controller and work independently.

FIG. 9B shows an embodiment of a modular soft robot arm 920 including three modular soft robot wrists. By connection several wrists together, the wrists on an arm may receive the command from a central controller and work independently. Each wrist may have three DOFs, the total DOFs on the long arm may be much larger, so that the arm may perform every agile maneuver for example 922.

Figure 9C:
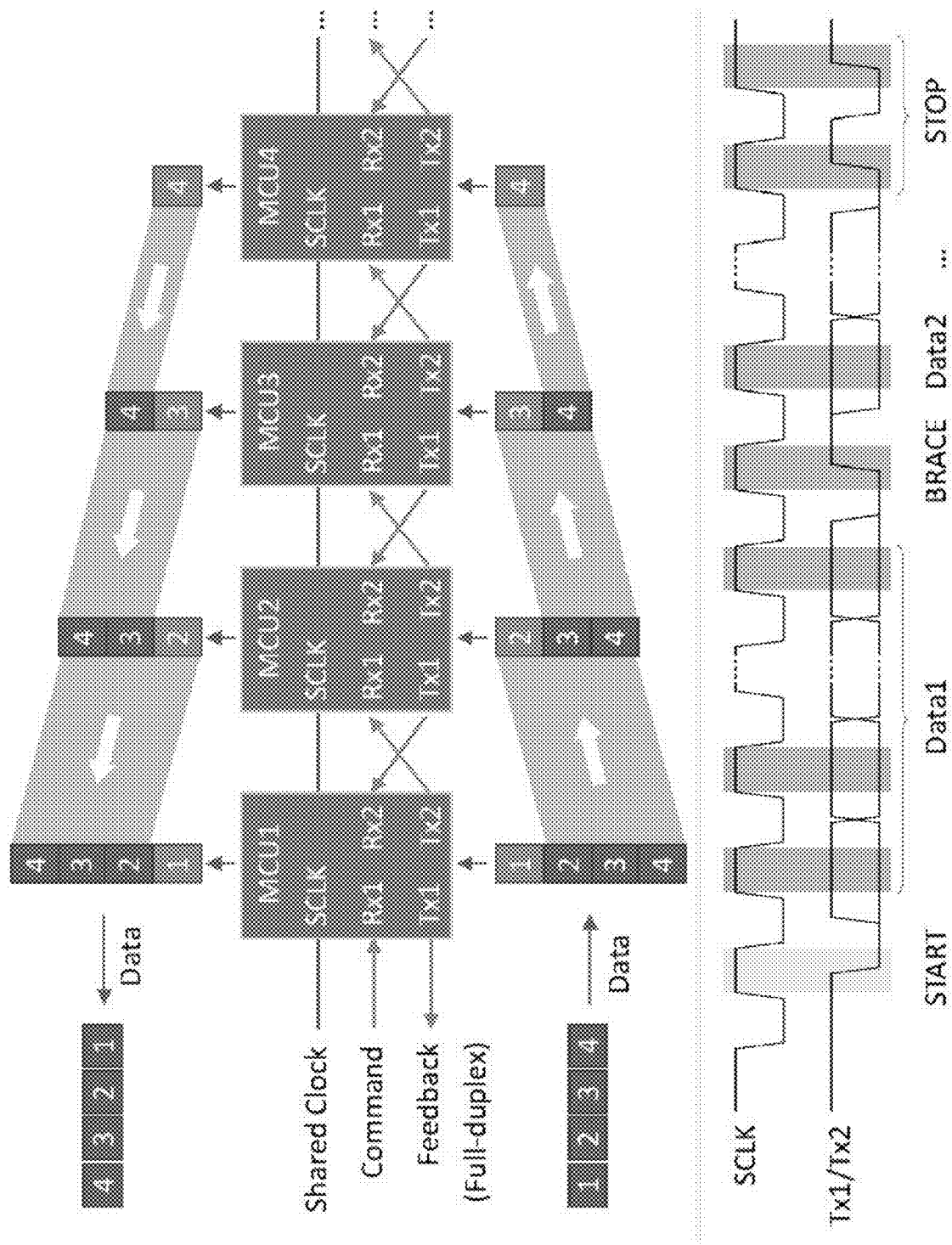
FIG. 9C is a schematic diagram of an embodiment for a communication protocol including an isomorphic synchronous transmit-receive (ISTR) between multiple modules, and a timing diagrams of ISTR protocol.
Figure 9D:
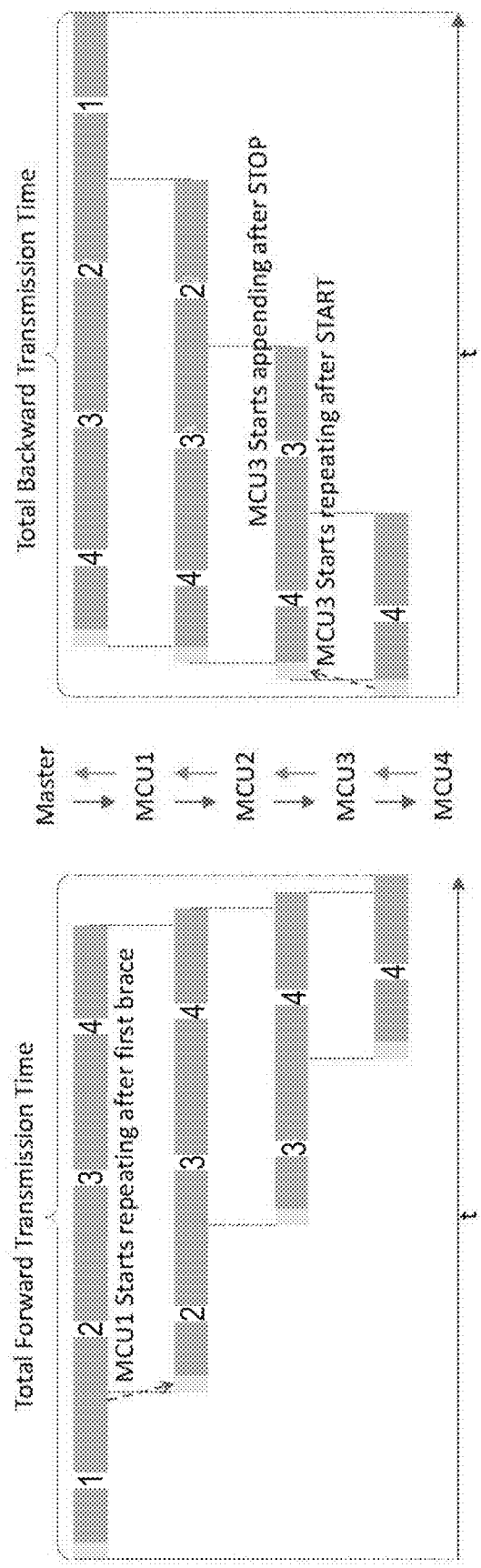
FIG. 9D is a schematic diagram showing sequences of sending and receiving data of all sections on a four-section arm.

Referring to FIGS. 9C and 9D, the present disclosure describes various embodiments of a unique communication method for controlling the modular arm including one or more twists. In order to make the robot truly "plug and play", the communication may get rid of both hardware and software address, and a module may act to the command according to its physical location. An isomorphic synchronous transmit-receive (ISTR) communication protocol may be used to achieve this. ISTR may be a fast address-free communication protocol between multiple modules that are identical in both hardware and software. ISTR may be built upon a universal synchronous/asynchronous receiver/transmitter (USART), which is commonly supported by MCUs as a specialized peripheral. This may make the modular design truly "plug and play" without changing any physical address or control program. In some implementations, this may allow easy switching or replacing of modules. It may require only three wires for full-duplex communication or two wires for half-duplex. The series of command may be packed by the order of the modules.

Referring to FIG. 9C, when a first module receives the data, it may keep the first segment of the data and send the rest to the next module; and the next module may repeat the same procedure. When the modules report feedback to the master, every module may report the data it receives from the next module and append its own at the end. The communication may be synchronous, allowing fast and robust transmission with less MCU performance requirement. In one implementation, a transmission rate of 50 kilobits per second (kpbs) on an 8 MHz MCU may be used. In another implementation, it may include two special flags: falling-edge and rising-edge on the data wire during HIGH state of a serial clock (SCLK). The timing diagram of ISTR shows that a transmission starts with a falling edge (START flag) and the data for different module may be separated by a rising-edge (BRACE flag). Data bits may be set during SCLK being LOW and be read during SCLK being HIGH. Two BRACE flags in a row may mark the end of the transmission (STOP).

FIG. 9D shows sequences of sending and receiving data of all sections on a four-section arm. One MCU may start repeating/appending data immediately after finishing its own part, minimizing the delay as a relay, thus reducing the latency of modules near the end effector on a long arm. For example, during forward transmission, a module may start to repeat data to the next as soon as the first BRACE is received; and during backward transmission, a module may start to repeat data to the pervious as soon as START is received and he module starts to append its own data after STOP. This may minimize the communication latency when there are many modules linked together.

The present disclosure describes various embodiments of utilizing EMPVs and embedding local controller onto the soft robots with ignorable additional weight and size. This may boost the density of degrees of freedom on a soft robot, which opens up many new possibilities. The present disclosure also solves a previous problem associated with previous soft robots carrying control components that have very few degrees of freedom or have to be made in large size due to the limitation of traditional valves.

One of the important applications of the EMPV is to develop highly modularized soft robot. Previous system is not scalable when adding a degree of freedom results in adding a tube that go through the robot. The present disclosure describes soft robots using EMPV based hybrid actuators that only needs constant number of tubes that act as arterial pressure supplies. Each module connects to the arterial individually by the easiest approach. The behavior of every module is controlled locally according to the commands sent from a central controller. In this way, the soft robot may include the structure analogy to our blood vessels system and nervous system, and such bionic framework even enables more biological inspirations to be implanted into a robot.

The EMPV may also have the potential to be made into even smaller size using customized solenoid. One of the easiest way to convert electric energy to macroscopic motion may be using solenoid. There may be no other easy approach currently available to generate the force and displacement the EMPV requires with reasonable voltage and current.

The soft tube used in the EMPV may determine almost all its characteristic. For common off-the-shelf tubes, softer material may result in faster closing response and higher shutoff efficiency, but the pressure rating may be lower, and it may be easier to collapse under negative pressure. With better materials, the performance of EMPV may improve. Fiber-enhanced silicone tubes may have thinner wall thickness and more strength while it is easier to be squeezed (smaller $F_e$), ideal for operating positive pressure. Tubes with thicker wall may improve the opening response time under negative pressure. Some tubes used in the previous embodiments may be good for universal low-pressure applications.

The EMPV may have a tedious name, "vasocontraction-like fluid regulator", implying that the EMPV may mimic how the blood flow is controlled in human organs. The present disclosure describes embodiments of a way to amplify a tiny force and control a soft robot. The EMPV structure may also be used in the application with micro actuators better than solenoid that may be developed in the future.

The present disclosure also describes embodiments of methods for implementing the above-discussed embodiments. In one embodiment, a method may include sending, by a circuitry electrically connecting with a valve, an electric current to the valve to switch the valve. In one implementation, the circuitry may send an opening current to the valve, so that the valve is configured to switch to an open state to allow a flow in a soft tube. In another implementation, the circuitry may send a closing current to the valve, so that the valve is configured to switch to a closed state to cut off the flow in the soft tube. The valve may include one or more of the above-discussed embodiments.

Below, the present disclosure describes some materials and methods used in one or more above-discussed embodiments.

EMPV Fabrication

The shell of the EMPV may be printed by an SLA 3D printer (for example but not limited to, Formlab Form 2) with a layer thickness of 50 micrometer (μm). The spacer and the gate may be cut from resin sheet (for example but not limited to, Delrin Acetal Resin Sheets, McMaster-Carr, 8573K271) by a milling machine (for example but not limited to, Bantam Tools Desktop PCB Milling Machine). The tube used in some embodiments may be an off-the-shelf silicone tube (for example but not limited to, Durometer 35A, 1/32" ID, 1/16" OD McMaster-Carr, 5236K501). The 3 pound per square inch (Psi) maximum pressure given in the description may be far below the burst pressure, which is above 30 Psi (200 kPa) for the tube. For the pressure range (−100 to 100 kPa), the radial deformation is not noticeable. The solenoid magnet may be an off-the-shelf product originally designed as electromagnetic brake. The neodymium magnet may be built inside the solenoid. In cases where the size of EMPV need to make even smaller, the support for bolts may be cut.

Squeezing Force Measurement

A test platform may be designed and 3D-printed to tune the force of the gate (for example but not limited to, S1). During this test, the gate may not be connected to the plunger, but a force gauge (for example but not limited to, VTSYIQI HF-5) instead. A bubbler may be connected to the tube after the gate to indicate the existence of the flow. For positive pressure, the tube may connect to the long glass tube of bubbler that goes below the fluid level; for negative pressure, the tube may connect to the short glass tube of the bubbler that stays above the fluid level. Changing of the fluid level or air bubble coming out of the long glass tube shows the soft tube may be now fully squeezed. In some implementation during real practices, it may be difficult to get to the point where the flow completely stops, so the squeezing force may be recorded when the leaking rate is slow enough, for example, <1 bubble in 10 seconds.

Response Time Measurement

The response time may be measured by a pressure sensor (for example but not limited to, MPX 5500) and a duel-channel oscilloscope (for example but not limited to, OWON VDS10221). Channel 1 of the oscilloscope may connect to the output of the pressure sensor, and channel 2 may measure the voltage difference of the solenoid. The voltage supply for the pressure sensor may be completely isolated from the supply for the solenoid to avoid the strong interference when the solenoid is energized. An isolated 5V supply may be supplied from a 7.4V Li-po battery and a voltage regulator. A simple circuit including an MCU, an integrated H-bridge and two proportional, integral, derivative (PID) buttons may be used to manually control the open and close of the EMPV. The MCU may monitor the state of the button, erase the jitter and control the input of H-bridge accordingly via I/O pins. This may avoid the voltage spikes on the solenoid and smooth the outcome.

The pressure sensor may have two inputs (P1 and P2). The pressure applied to P1 may be greater than the pressure applied to P2. The voltage output from the sensor may be linear to the pressure difference of P1 and P2, from 0 kPa to 500 kPa. The actual pressure difference is calculated by: $\Delta P=(V_{out}/V_s-0.04)/0.0018$, where $V_s$ is the voltage apply to the sensor.

For positive pressure, a regulator may be used to control the pressure applied to the inlet of the EMPV. A short tube may connect the outlet to P1 while P2 opens to the ambient. A tiny hole may be opened on the tube so that the pressure may return to ambient slowly after the EMPV is closed but may not affect the pressure readout during the measurement. At least six data may be collected at each one of the seven different pressure ranging from 25 kPa to 110 kPa. For negative pressure, the outlet may connect to P2. No vacuum regulator may be available, so the measurements may be scattered within −80 kPa to −40 kPa. There may be twenty measurements in total for negative pressure.

Hybrid Actuator Fabrication

The soft pneumatic actuator on the prototype hybrid actuator may be made of catalyzed liquid silicone rubber (for example but not limited to, Magikmold 6335 35A Clear Platinum Cure RTV Silicone). The pot life for the silicone may be 90 minutes, and the cure time may be 10 hours under room temperature. After mixing the liquid silicone with the catalyze, the mixture may be degassed for 30 minutes and then pour into a three-piece mold. The mold may contain two 3D-printed resin outer molds and one wax inner mold.

The wax mold may be prepared by another set of resin molds. After the silicone is cured, two outer molds may be removed, and the inner mold may be melted and recycled.

The frame of the local three-state controller may have the frame for two EMPVs, a fitting to the pneumatic actuator and implanted channels. They may be merged in the CAD and printed as a single part. Then the EMPVs may be assembled on the frame and the silicone actuator may be locked to the fitting by a fixer with two nylon bolts. Usually the silicone rubber may be self-sealing, but in case the surface of the actuator has wax residues, an O-ring may be used to seal the fitting.

To connect the soft tube to the printed channel, a 1/16' ID Buna-N O-Ring (for example but not limited to, McMaster-Carr, 9452K311) may be used. A set of washers may press the O-ring onto the gap between the tube and the channel. The washers may be cut from the same resin sheet used to make the spacer and the gate in the EMPV. The sealing can withstand the burst pressure of the tube.

The circuit board on the hybrid actuator may connect wires from the solenoids to the duel H-bridge driver. The power supply and the input pins of the driver may go to a 6-position FFC adapter (for example but not limited to, Molex, 503480-0600).

In the feedback control demo, an FFC may connect the hybrid actuator to a micro controller (for example but not limited to, Raspberry Pi 3 with Pi camera) using an FFC to GPIO adapter. The adapter may be also made with the PCB milling machine. The Pi camera may be fixed 15 cm above the actuator, so it may capture the whole actuator even when the actuator is at its maximum length. The Raspberry Pi may search the end of the actuator and an object next to it by thresholding. Then it may compare the location of the object with the length of the actuator, and may decide whether the actuator may inflate, deflate or hold still. There may be a small displacement tolerance for the object to avoid oscillation. In one implementation, the small displacement may be about 5 millimeter (mm). Here, in the present disclosure, "about" a value may refer to a range of between 90% and 110% of the value, inclusive.

Modular Wrist Fabrication

The modular wrist may be a combination of three hybrid actuators. The low-profile LTC may be designed by placing the frame of the EMPVs next to the actuator fitting and re-arrange the channels so that the additional length along the actuator is minimized. Three low profile LTCs and a duel-channel pressure distributor may be merged together and printed as one part using the SLA 3D printer mentioned above. The three H-bridges to drive the hybrid actuators may locate on a single circuit board with the MCU. The circuit boards may be made by the Bantam Tools Desktop PCB Milling Machine from double-sided FR-1 PCB blanks. A SMD soldering station may be used to solder all the SMD packages. After soldering, the entire circuit may be coated by acrylic conformal coating (for example but not limited to, Techspray 2108) to prevent corruption.

The MCUs used in the wrist in one or more of the embodiments may be, for example but not limited to, either STM32F030F4 or STM32F030K6 depending on the version. They may have identical ARM core (for example but not limited to, Cortex-M0) and same clock frequency (8 MHz internal clock), though STM32F030K6 features 9 more I/Os and more Flash capacity (32 kb) than STM32F030F4. An external crystal oscillator may boost the clock speed up to 48 MHz if necessary.

The ISTR may run in half-duplex mode in the prototype multi-wrist arm (single data wire). The only feedback data from the arm may be the initial self-checking report, for most of the time data go from the master to the wrists. The communication speed may be set to be 50 kHz on the arm, while the maximum tested speed is 400 kHz under 48 MHz clock speed. The maximum communication speed may decrease with the increase of communication distance.

The connectors containing channels may be printed with SLA 3D printer. The liquid-based filament may fill up the defects (if there is any) during printing process and may cure with the surrounding into solid afterwards, so the channel may be fluid-tight can withstand high pressure. Other supportive parts may be printed by, for example but not limited to, Lulzbot Taz 6 using PLA material. The Ribbing used to confine the deformation of the actuators may be also cut from, for example but not limited to, the Delrin acetal resin sheet using the milling machine.

The present disclosure describes embodiments of devices and method for localizing fluid control, which may reduce the number of tubes connecting to fluid-driven soft robots that have many degrees of freedom (DOF), making them less tethered and enabling modular design. In one embodiment, an embeddable micro pitch valve (EMPV) may be light (<2.5 gram) and small (<2 $cm^3$) to be built into many types of actuators. The EMPV may manipulate a flow of a fluid by directly squeezing a soft tube connecting the actuator to the pressure supplies. In another embodiment, a hybrid actuators including two EMPVs and a fluid actuator may be controlled by electric signals while powered by pneumatic force. In another embodiment, a 3-DOF modular wrist is described to include three hybrid actuators, a pressure distributer, and a local controller circuit. In another embodiment, a functional soft robotics arm is described to include multiple modules connecting in series. These embodiments may preserve the integrity of the flow channel, reducing sealing components. The actuators may be powered by a set of arterial pressure supplies, solving the scalability problem of fluid powered soft robots. The embodiments shows that more actuators with more DOFs may be used in constructing soft robots, making the soft robot more dexterous and biomimetic.

Through the descriptions of the preceding embodiments, persons skilled in the art may understand that the device, system, and/or method according to the foregoing embodiments may be implemented by hardware only or by software and a necessary universal hardware platform. In some cases, using software and a necessary universal hardware platform are preferred. Based on such an understanding, the technical solutions of the present disclosure essentially, or the part contributing to the prior art may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of the present disclosure.

While the particular disclosure has been described with reference to illustrative embodiments, this description is not meant to be limiting. Various modifications of the illustrative embodiments and additional embodiments of the invention will be apparent to one of ordinary skill in the art from this description. Those skilled in the art will readily recognize that these and various other modifications can be made to the exemplary embodiments, illustrated and described herein, without departing from the spirit and scope of the present invention. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A device for localized flow control, the device comprising:
a plunger configured to slide along a longitudinal axis, the plunger comprising a proximal end and a distal end along the longitudinal axis;
a gate connecting to the proximal end of the plunger and configured to slide with the plunger along the longitudinal axis;
a spacer disposed along the longitudinal axis and on a same side with the gate relative to the plunger;
a soft tube disposed in a gap between the spacer and a proximal end of the gate; and
a plunger controller enclosing the distal end of the plunger and configured to slide the plunger between a closed position and an open position along the longitudinal axis, wherein:
in response to the plunger at the open position, the device is at an open state and the gap has a first width configured to allow a flow in the soft tube, and
in response to the plunger at the closed position, the device is at a closed state and the gap has a second width configured to cut off the flow in the soft tube,
wherein:
the plunger controller comprises a solenoid and a circuitry, the solenoid configured to receive an electric current, and
the circuitry comprises an integrated H-bridge circuit, the integrated H-bridge circuit configured to control a direction of the electric current.

2. The device according to claim 1, wherein:
the plunger is made of a ferromagnetic material or shape-memory material; and
the device further comprises a permanent magnet disposed at a distal end of the plunger controller, the permanent magnet generating an attraction force on the plunger, wherein the attractive force on the plunger has a direction from the open position towards the closed position.

3. The device according to claim 1, wherein:
the circuitry is configured to send an opening current to the plunger controller to switch the plunger to the open position, and
the circuitry is configured to send a closing current to the plunger controller to switch the plunger to the closed position.

4. The device according to claim 3, wherein:
the opening current and the closing current have opposite directions.

5. The device according to claim 3, wherein:
in response to the plunger at the closed position, the circuitry is configured to output zero current.

6. The device according to claim 1, wherein:
the spacer is fixedly disposed relative to the plunger controller.

7. The device according to claim 1, wherein:
the spacer comprises a flat surface, wherein the flat surface of the spacer is perpendicular to the longitudinal axis; and
the proximal end of the gate comprises a flat surface, wherein the flat surface of the proximal end of the gate is perpendicular to the longitudinal axis.

8. The device according to claim 7, wherein:
the soft tube is disposed between the flat surface of the spacer and the flat surface of the proximal end of the gate.

9. The device according to claim 1, wherein:
the second width is about twice a wall thickness of the soft tube.

10. The device according to claim 1, wherein:
in response to the plunger at the closed position, the gap is configured to deform the soft tube to cut off the flow in the soft tube.

11. The device according to claim 1, wherein:
the proximal end of the plunger comprises a socket, wherein the gate connects to the plunger via the socket.

12. The device according to claim 1, wherein:
the soft tube comprises a soft silicon tube.

13. A method for localized flow control with a valve, the method comprising:
sending, by a circuitry electrically connecting with a valve, an electric current to the valve to switch the valve; and
wherein the valve comprises:
a plunger configured to slide along a longitudinal axis, the plunger comprising a proximal end and a distal end along the longitudinal axis,
a gate connecting to the proximal end of the plunger and configured to slide with the plunger along the longitudinal axis,
a spacer disposed along the longitudinal axis and on a same side with the gate relative to the plunger,
a soft tube disposed in a gap between the spacer and a proximal end of the gate, and
a plunger controller enclosing the distal end of the plunger and configured to slide the plunger between a closed position and an open position along the longitudinal axis, wherein:
the plunger controller comprises a solenoid configured to receive the electric current from the circuitry,
the circuitry comprises an integrated H-bridge circuit, the integrated H-bridge circuit configured to control a direction of the electric current,
in response to the electric current from the circuitry being an opening current, the plunger controller is configured to switch the plunger to the open position, so that the valve is at an open state and the gap has a first width configured to allow a flow in the soft tube, and
in response to the electric current from the circuitry being a closing current, the plunger controller is configured to switch the plunger to the closed position, so that the valve is at a closed state and the gap has a second width configured to cut off the flow in the soft tube.

14. The method according to claim 13, wherein:
the plunger is made of a ferromagnetic material or shape-memory material; and
the valve further comprises a permanent magnet disposed at a distal end of the plunger controller, the permanent magnet generating an attraction force on the plunger, wherein the attractive force on the plunger has a direction from the open position towards the closed position.

15. The method according to claim 13, wherein:
the opening current and the closing current have opposite directions; and in response to the valve at the closed position, the circuitry is configured to output zero current.

16. The method according to claim 13, wherein:
the spacer is fixedly disposed relative to the plunger controller;
the spacer comprises a flat surface, wherein the flat surface of the spacer is perpendicular to the longitudinal axis;
the proximal end of the gate comprises a flat surface, wherein the flat surface of the proximal end of the gate is perpendicular to the longitudinal axis; and
the soft tube is disposed between the flat surface of the spacer and the flat surface of the proximal end of the gate.

17. The method according to claim 13, wherein:
the second width is about twice a wall thickness of the soft tube; and
in response to the plunger being at the closed position, the gap is configured to deform the soft tube to cut off the flow in the soft tube.

18. The method according to claim 13, wherein:
the proximal end of the plunger comprises a socket, wherein the gate connects to the plunger via the socket.

19. The method according to claim 13, wherein:
the soft tube comprises a soft silicon tube.

* * * * *